US012569935B2

(12) United States Patent
Kayashima et al.

(10) Patent No.: US 12,569,935 B2
(45) Date of Patent: Mar. 10, 2026

(54) ADDITIVE MANUFACTURING APPARATUS AND ADDITIVE MANUFACTURING METHOD

(71) Applicant: Mitsubishi Electric Corporation, Tokyo (JP)

(72) Inventors: Shun Kayashima, Tokyo (JP); Nobuyuki Sumi, Tokyo (JP); Shigeru Takushima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/120,247

(22) PCT Filed: Feb. 14, 2023

(86) PCT No.: PCT/JP2023/004893
§ 371 (c)(1),
(2) Date: Apr. 11, 2025

(87) PCT Pub. No.: WO2024/171274
PCT Pub. Date: Aug. 22, 2024

(65) Prior Publication Data
US 2025/0256355 A1 Aug. 14, 2025

(51) Int. Cl.
B23K 26/342 (2014.01)
B23K 26/03 (2006.01)
(Continued)

(52) U.S. Cl.
CPC .......... B23K 26/342 (2015.10); B23K 26/032 (2013.01); B23K 26/0626 (2013.01);
(Continued)

(58) Field of Classification Search
CPC ................ B23K 26/342; B23K 26/032; B23K 26/0626; B23K 37/06; B33Y 30/00; B33Y 50/02
See application file for complete search history.

(56) References Cited

U.S. PATENT DOCUMENTS 11,229,956 B2 1/2022 Kayashima et al.
2021/0245252 A1* 8/2021 Kayashima .......... B23K 26/342
(Continued)

FOREIGN PATENT DOCUMENTS

CN 106735210 A 5/2017
CN 114850936 A 8/2022
(Continued)

OTHER PUBLICATIONS

International Search Report and Written Opinion mailed on May 9, 2023, received for PCT Application PCT/JP2023/004893, filed on Feb. 14, 2023, 9 pages including English Translation.
(Continued)

*Primary Examiner* — Brian W Jennison
*Assistant Examiner* — Kristina J Babinski
(74) *Attorney, Agent, or Firm* — XSENSUS LLP

(57) ABSTRACT

An additive manufacturing apparatus includes: a shaping unit including a material supply unit, a heat source output unit for melting the material, and a drive unit that moves the heat source and the material supply unit, the shaping unit being configured to form a bead with the material melted; an operation amount adjustment unit that adjusts a material supply amount or a heat source output based on a shape error of the bead; and an operation amount readjustment unit that, in a case where an appropriate range of the material supply amount with respect to a value of the heat source output is set and the value of the material supply amount is out of the appropriate range after adjustment, selects the material supply amount or the heat source output as an operation amount, and preferentially readjusts the operation amount selected.

17 Claims, 17 Drawing Sheets

(51) Int. Cl.

| | |
|---|---|
| *B23K 26/06* | (2014.01) |
| *B23K 26/062* | (2014.01) |
| *B23K 37/06* | (2006.01) |
| *B33Y 30/00* | (2015.01) |
| *B33Y 50/02* | (2015.01) |

(52) U.S. Cl.
CPC .............. *B23K 37/06* (2013.01); *B33Y 30/00* (2014.12); *B33Y 50/02* (2014.12)

(56) References Cited

U.S. PATENT DOCUMENTS

| | | | | |
|---|---|---|---|---|
| 2021/0323092 | A1* | 10/2021 | Morita | B23K 26/211 |
| 2022/0043430 | A1* | 2/2022 | Iriguchi | G05B 19/41865 |
| 2022/0324057 | A1 | 10/2022 | Takushima et al. | |
| 2023/0294170 | A1 | 9/2023 | Takushima et al. | |
| 2024/0261900 | A1 | 8/2024 | Kayashima et al. | |

FOREIGN PATENT DOCUMENTS

| | | | |
|---|---|---|---|
| JP | 6765569 | B1 | 10/2020 |
| JP | 7166489 | B1 | 11/2022 |
| WO | 2020/084673 | A1 | 4/2020 |
| WO | 2022/044163 | A1 | 3/2022 |

OTHER PUBLICATIONS

Notification of Reason for Refusal mailed on Aug. 1, 2023, received for JP Application 2023-540577, 4 pages including English Translation.

Decision to Grant a Patent mailed on Oct. 17, 2023, received for JP Application 2023-540577, 5 pages including English Translation.

Office Action mailed on Dec. 12, 2025 in corresponding Chinese Patent Application No. 202380082420.6 (13 pgs).

* cited by examiner (a)         (b)

(c)

(a)                                            (b)

(c)

(a)

(b)

(c)

ADDITIVE MANUFACTURING APPARATUS AND ADDITIVE MANUFACTURING METHOD

CROSS-REFERENCE TO RELATED APPLICATION

This application is a national stage application, pursuant to 35 U.S.C. § 371, of International Patent Application No. PCT/JP2023/004893, filed Feb. 14, 2023, the entire contents of which are incorporated herein by reference.

FIELD

The present disclosure relates to an additive manufacturing apparatus and an additive manufacturing method for manufacturing a three-dimensional object.

BACKGROUND

Additive manufacturing (AM) is known as a technology for forming a three-dimensional object.

Directed energy deposition (DED) is one of multiple types of additive manufacturing methods, in which an additive manufacturing apparatus forms a bead by irradiating a material and a workpiece with a beam while supplying the material to a specified position. The bead is a solidified product obtained by solidifying a molten material on a workpiece. The additive manufacturing apparatus manufactures an object by sequentially stacking beads.

In additive manufacturing machining, an error from the target shape may occur in the shape of the formed bead due to a plurality of factors. For this reason, conventionally, various methods for reducing the shape error by the control of the additive manufacturing apparatus have been proposed. Patent Literature 1 proposes a technique for correcting the amount of material supplied to a machining point based on a measurement result of the height of a bead with respect to a shape error in which the height of the bead has an error from the target height.

CITATION LIST

Patent Literature

Patent Literature 1: Japanese Patent No. 6765569

SUMMARY OF INVENTION

Problem to be Solved by the Invention

In additive manufacturing machining, the output value of a heat source that melts the material determines the amount of material that can be melted at the machining point. In a case where the amount of material that is supplied to the machining point is corrected, it is difficult to continue the machining unless an appropriate amount of material can be melted. Thus, in the case of additive manufacturing machining, even after the operation amount to be controlled is corrected, a constraint for continuing the machining may not be satisfied. For this reason, the conventional technique as described in Patent Literature 1 above has a problem that it may be difficult to manufacture an object with reduced error.

The present disclosure has been made in view of the above, and an object thereof is to obtain an additive manufacturing apparatus capable of manufacturing an object with reduced error.

Means to Solve the Problem

In order to solve the above-described problems and achieve the object, an additive manufacturing apparatus according to the present disclosure includes: a shaping unit including a material supply unit to supply a material to a workpiece, a heat source output unit to output a heat source for melting the material, and a drive unit to move the heat source and the material supply unit, the shaping unit being configured to form a bead with the material melted using the heat source; an operation amount adjustment unit to adjust a material supply amount of the material supply unit or a heat source output of the heat source output unit based on a shape error of the bead; and an operation amount readjustment unit to, in a case where an appropriate range that is a range of a value of the material supply amount with respect to a value of the heat source output with which the bead can be appropriately formed is set and a value of the material supply amount with respect to a value of the heat source output is out of the appropriate range after adjustment by the operation amount adjustment unit, select one of the material supply amount or the heat source output as an operation amount to be preferentially adjusted, and preferentially readjust the operation amount selected.

Effects of the Invention

The additive manufacturing apparatus according to the present disclosure can achieve the effect of manufacturing an object with reduced error.

DESCRIPTION OF EMBODIMENTS

Hereinafter, an additive manufacturing apparatus and an additive manufacturing method according to embodiments will be described in detail with reference to the drawings.

First Embodiment

Figure 1:
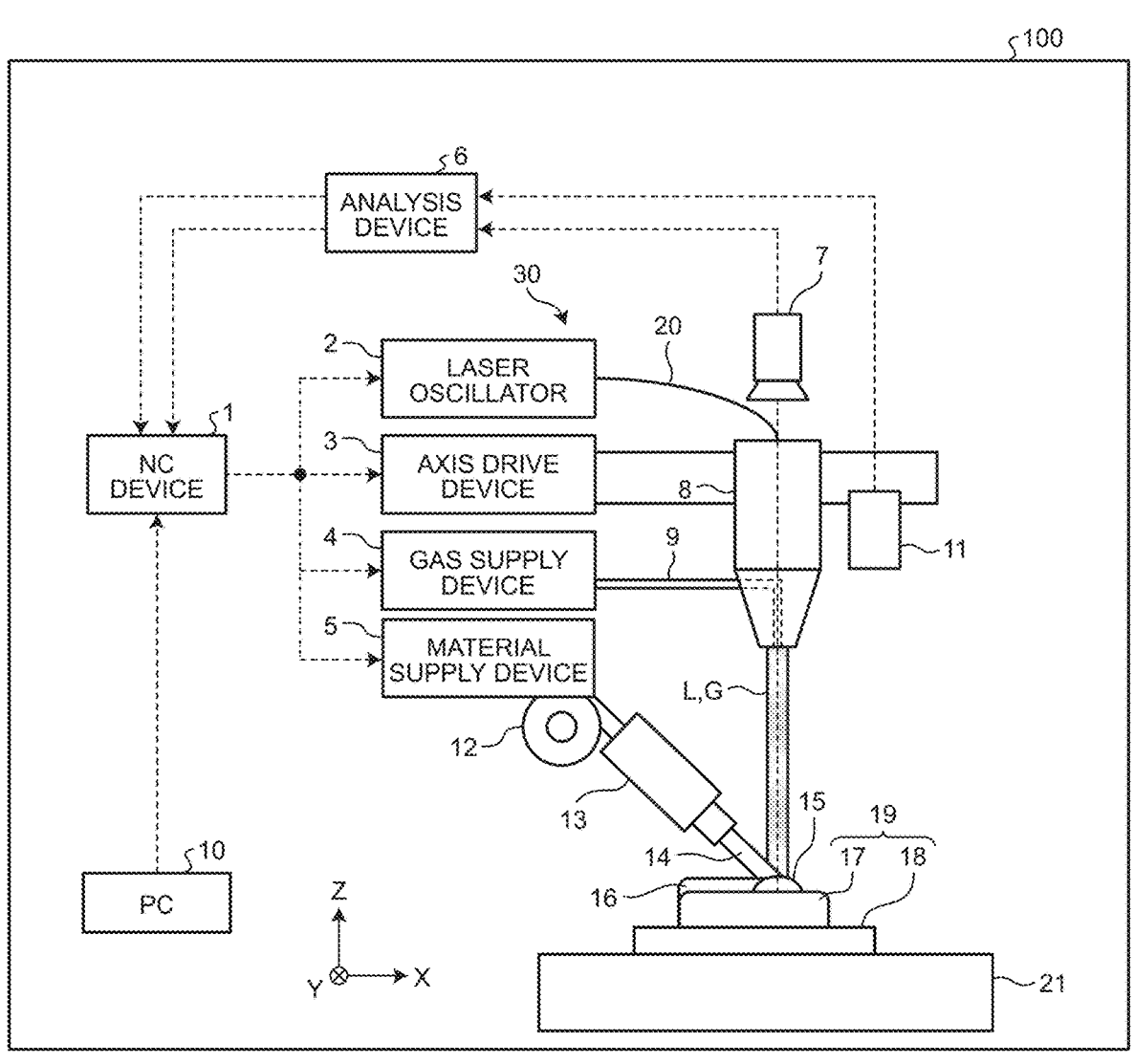
FIG. 1 is a diagram illustrating an example of an additive manufacturing apparatus according to the first embodiment.

FIG. 1 is a diagram illustrating an example of an additive manufacturing apparatus 100 according to the first embodiment. The additive manufacturing apparatus 100 is a DED-type additive manufacturing apparatus. The additive manufacturing apparatus 100 manufactures an object 17 by supplying a material to a workpiece 19 and stacking beads 16 formed of the material melted using a beam. The beam is a heat source that melts the material, and is a laser beam L, an electron beam, or the like. The heat source is not limited to the beam, and may be an arc. In the first embodiment, a case where the heat source is the laser beam L will be described as an example. In the first embodiment, the material is a metal wire 14. The material is not limited to the wire 14, and may be powder.

The additive manufacturing apparatus 100 forms the bead 16 by irradiating the wire 14 and the workpiece 19 with the laser beam L while supplying the wire 14 to a specified position. The bead 16 is formed in a molten pool 15. The molten pool 15 is a pool of molten metal formed by melting the workpiece 19 and the wire 14 by irradiation with the laser beam L.

A layer of beads 16 is formed by arranging a plurality of beads 16 on a base material 18. By stacking layers of beads 16, the object 17, which is a deposit of the beads 16, is formed. Thus, the additive manufacturing apparatus 100 manufactures the object 17, which is a three-dimensional object, by stacking the beads 16. The base material 18 illustrated in FIG. 1 is a plate material. The base material 18 may be a material other than a plate material. The workpiece 19 is a thing to which a melted material is added, and includes the base material 18 and the object 17 being shaped. The object 17 is formed on the base material 18.

The X axis, the Y axis, and the Z axis are three axes perpendicular to each other. The X axis and the Y axis are two horizontal axes. The Z axis is a vertical axis. In each of the X-axis direction, the Y-axis direction, and the 2-axis direction, a direction indicated by an arrow is plus, and a direction opposite to the arrow is minus. The plus Z direction is assumed to be a vertically upper direction. The beads 16 are stacked in the plus 2 direction.

The additive manufacturing apparatus 100 includes a numerical control (NC) apparatus 1, a laser oscillator 2, an axis drive device 3, a gas supply device 4, a material supply device 5, an analysis device 6, a camera 7, a machining head 8, a personal computer (PC) 10, and a stage 21. The base material 18 is fixed to the stage 21. The laser oscillator 2, the axis drive device 3, the gas supply device 4, the material supply device 5, the machining head 8, and the stage 21 constitute a shaping unit 30 that manufactures the object 17 by stacking the beads 16 formed of the material melted using the laser beam L.

The laser oscillator 2 that is a beam source outputs the laser beam L. The laser oscillator 2 is an example of a heat source output unit that outputs a heat source. The laser beam L output from the laser oscillator 2 propagates through a fiber cable 20 which is an optical transmission line, and enters the machining head 8. An optical system such as a collimating optical system or a condensing optical system is disposed inside the machining head 8. The optical system is not illustrated. The laser oscillator 2, the fiber cable 20, and the machining head 8 constitute an irradiation unit that irradiates the workpiece 19 with the laser beam L.

The machining head 8 is equipped with a beam nozzle through which the laser beam L emitted from the machining head 8 toward a machining point passes, and a gas nozzle 9 that ejects a shielding gas G toward the machining point. The central axis of the beam nozzle coincides with the optical axis of the optical system. The central axis of the beam nozzle also coincides with the Z-axis. The center line of the laser beam L with which the workpiece 19 is irradiated coincides with the Z axis. The laser beam L passes through the optical system inside the machining head 8, passes through the beam nozzle, and is emitted from the machining head 8. The machining point is the irradiation position of the laser beam L on the workpiece 19, and is a region to which the wire 14 is added. The additive manufacturing apparatus 100 moves the machining point along the movement path during the additive machining of adding the molten material. The position of the machining point is a position at which the heat source and the material are supplied, and which is on the central axis of the beam nozzle.

The gas supply device 4 supplies the shielding gas G from a gas supply source to the gas nozzle 9. An example of the gas supply source is a gas cylinder. The gas supply source is connected to the gas nozzle 9 via a pipe. The gas supply source and the pipe are not illustrated. The gas supply device 4 can change the flow rate of the shielding gas G based on a gas supply command from the NC device 1. By ejecting the shielding gas G, oxidation of the material and the workpiece 19 is reduced, and the object 17 is cooled. The shielding gas G is desirably an inert gas such as argon gas.

The material supply device 5, which is a material supply unit, supplies the wire 14 toward the machining point. The material supply device 5 includes a material supply source 12 and a material supply nozzle 13. The material supply device 5 supplies the wire 14 fed from the material supply source 12 to the machining point by the material supply nozzle 13. FIG. 1 illustrates an example of a side supply method of supplying the wire 14 from the material supply nozzle 13 disposed obliquely above the machining point. Instead of the side supply method, the material supply device 5 may use a center supply method of supplying the wire 14 from the material supply nozzle 13 disposed immediately above the machining point. The material supply device 5 is operated by a servomotor, and can change the supply speed of the wire 14 based on a material supply command from the NC device 1.

The axis drive device 3 moves the machining head 8, the material supply device 5, and a measurement instrument 11 in the X-axis direction, the Y-axis direction, and the Z-axis direction based on a movement speed command from the NC device 1. The positional relationship among the machining head 8, the material supply device 5, and the measurement instrument 11 is fixed. An example of the axis drive device 3 is a servomotor that moves the machining head 8, the material supply device 5, and the measurement instrument 11 in the X-axis direction, a servomotor that moves the machining head 8, the material supply device 5, and the measurement instrument 11 in the Y-axis direction, and a servomotor that moves the machining head 8, the material supply device 5, and the measurement instrument 11 in the Z-axis direction. The servomotors are not illustrated. The additive manufacturing apparatus 100 can move the irradiation position of the laser beam L, the supply position of the wire 14, and the measurement position by the measurement instrument 11 to any positions within the stroke range of the machining head 8, the material supply device 5, and the measurement instrument 11 by operating each servomotor.

The camera 7 is an imaging device that captures an image of a region including the machining point on the workpiece 19 from vertically above. As an example, the camera 7 acquires an image of a region including the machining point, and outputs the acquired image to the analysis device 6.

The measurement instrument 11 measures a bead height which is the Z-axis direction height of the bead 16 formed in the molten pool 15. As an example, the measurement instrument 11 is a laser displacement sensor. The measurement instrument 11 is installed at a position movable in the X-axis direction, the Y-axis direction, and the Z-axis direction by the axis drive device 3. The measurement instrument 11 outputs a measurement result of the bead height to the analysis device 6.

The analysis device 6 measures a bead width which is the width of the bead 16 formed in the molten pool 15 by analyzing an image input from the camera 7. In addition, the analysis device 6 obtains a bead width error which is an error in the width of the formed bead 16. The analysis device 6 calculates the difference between the measured value of the bead width and the target value of the bead width to obtain the bead width error. The analysis device 6 outputs a bead width error amount which is the value of the bead width error to the NC device 1.

The analysis device 6 obtains a bead height error which is an error in the height of the formed bead 16. The analysis device 6 calculates the difference between the bead height measured by the measurement instrument 11 and the target value of the bead height to obtain the bead height error. The analysis device 6 outputs a beat height error amount which is the value of the bead height error to the NC device 1.

The NC device 1 is a control device that controls the entire additive manufacturing apparatus 100. The NC device 1 controls the additive manufacturing apparatus 100 according to a machining program and machining conditions. In the machining program, a movement command for moving the machining head 8 and the material supply device 5 in a preset path is described. The machining conditions include information necessary for forming the bead 16, such as laser output, which is the output of the laser beam L by the laser oscillator 2, movement speed, which is the speed for moving the irradiation position of the laser beam L and the supply position of the wire 14, material supply amount, which is the amount for supplying the wire 14 by the material supply device 5, and gas flow rate, which is the flow rate of the shielding gas G. In the following description, the laser output is also referred to as heat source output. The material supply amount in the following description is also referred to as material supply rate.

The NC device 1 controls the axis drive device 3 according to the machining program by outputting a position command according to the machining program to the axis drive device 3. The axis drive device 3 moves the machining head 8 and the material supply device 5 along a preset movement path according to the position command.

The NC device 1 controls the laser oscillator 2 by outputting a laser output command to the laser oscillator 2 according to the machining conditions. The laser oscillator 2 outputs the laser beam L according to the laser output command. The NC device 1 controls the material supply device 5 by outputting a material supply command to the material supply device 5 according to the machining conditions. The material supply device 5 supplies the material supply amount of wire 14 according to the material supply command. The NC device 1 outputs a movement speed command to the axis drive device 3 according to the machining conditions. The axis drive device 3 moves the irradiation position of the laser beam L and the supply position of the wire 14 at a movement speed according to the movement speed command. The NC device 1 controls the gas supply device 4 by outputting a gas supply command to the gas supply device 4 according to the machining conditions. The gas supply device 4 supplies the shielding gas G at a gas flow rate according to the gas supply command.

Values of various parameters for control of the additive manufacturing apparatus 100 are input to the PC 10 by a user of the additive manufacturing apparatus 100. The PC 10 outputs the input information to the NC device 1. The PC 10 also displays an operation screen for operating the additive manufacturing apparatus 100.

Note that the NC device 1 and the PC 10 illustrated in FIG. 1 are built in the additive manufacturing apparatus 100. That is, the NC device 1 and the PC 10 are components of the additive manufacturing apparatus 100. At least one of the NC device 1 or the PC 10 may be a device outside the additive manufacturing apparatus 100.

Next, an outline of the operation of the additive manufacturing apparatus 100 will be described. After the base material 18 is fixed on the stage 21, the additive manufacturing apparatus 100 operates the laser oscillator 2, the axis drive device 3, the gas supply device 4, and the material supply device 5 under the control of the NC device 1. The additive manufacturing apparatus 100 operates the laser oscillator 2 to irradiate the machining point with the laser beam L. The additive manufacturing apparatus 100 supplies the wire 14 to the machining point by operating the material supply device 5. The additive manufacturing apparatus 100 ejects the shielding gas G to the machining point by operating the gas supply device 4. The additive manufacturing apparatus 100 moves the machining point on the movement path by operating the axis drive device 3.

The molten pool 15 is formed on the workpiece 19 by irradiation with the laser beam L. The bead 16 is formed by movement of the machining point along with formation of the molten pool 15. The object 17 is formed by stacking the beads 16.

Figure 2:
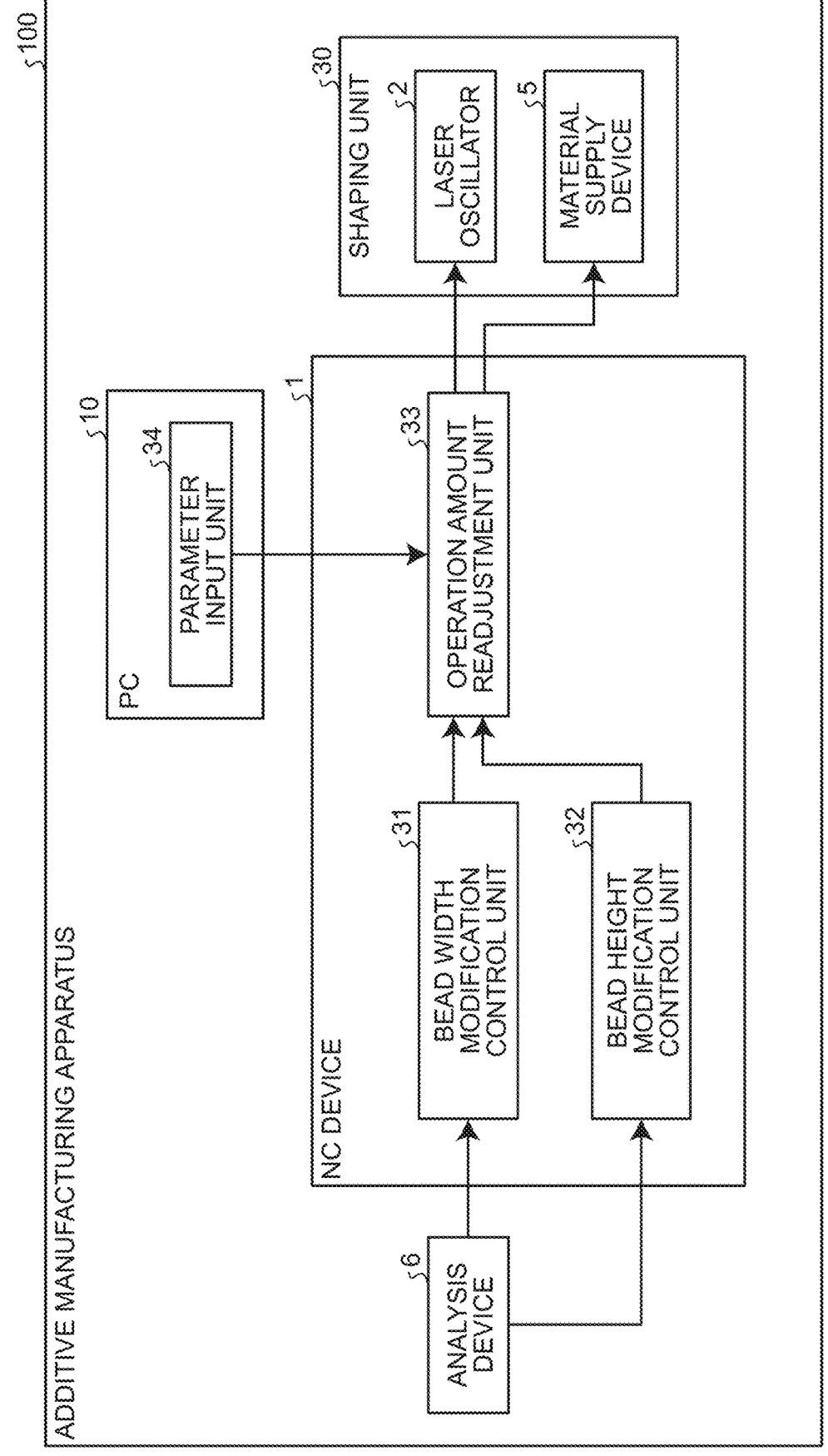
FIG. 2 is a diagram illustrating an exemplary functional configuration of the additive manufacturing apparatus according to the first embodiment.

Next, a function of reducing the shape error of the bead 16 will be described. The additive manufacturing apparatus 100 has a function of reducing the shape error of the bead 16. FIG. 2 is a diagram illustrating an exemplary functional configuration of the additive manufacturing apparatus 100 according to the first embodiment. FIG. 2 illustrates an exemplary functional configuration for the function of reducing the shape error of the bead 16.

The NC device 1 includes a bead width modification control unit 31, a bead height modification control unit 32, and an operation amount readjustment unit 33. The bead width modification control unit 31 and the bead height modification control unit 32 function as an operation amount adjustment unit that adjusts the material supply amount of the material supply device 5 or the heat source output of the laser oscillator 2 based on the shape error of the bead 16. In the first embodiment, it is assumed that each of the bead width error and the bead height error is the shape error of the bead 16.

The bead width error amount calculated by the analysis device 6 is input to the bead width modification control unit 31. After the bead width error amount is input, the bead width modification control unit 31 adjusts, based on the bead width error amount, the laser output indicated by the laser output command generated based on the machining conditions. The bead width modification control unit 31 controls the modification of the bead width by adjusting the laser output based on the bead width error amount. The bead width modification control unit 31 outputs the adjusted value of the laser output to the operation amount readjustment unit 33.

The bead height error amount calculated by the analysis device 6 is input to the bead height modification control unit 32. After the bead height error amount is input, the bead height modification control unit 32 adjusts, based on the bead height error amount, the material supply amount indicated by the material supply command generated based on the machining conditions. The bead height modification control unit 32 controls the modification of the bead height by adjusting the material supply amount based on the bead height error amount. The bead height modification control unit 32 outputs the adjusted value of the material supply amount to the operation amount readjustment unit 33.

The PC 10 includes a parameter input unit 34 to which values of various parameters are input. The values of the various parameters are input by user operation, for example. An allowable error amount, which is one of the values of parameters, is input to the parameter input unit 34. In the first embodiment, the allowable error amount is an acceptable value of bead height error. Through input of the allowable error amount to the parameter input unit 34, the allowable error amount is set in the additive manufacturing apparatus 100. The parameter input unit 34 functions as an allowable error amount setting unit that sets an allowable error amount. The parameter input unit 34 outputs the input allowable error amount to the NC device 1.

The operation amount readjustment unit 33 readjusts the laser output or the material supply amount. Here, readjustment means that the operation amount readjustment unit 33 further adjusts at least one of the laser output or the material supply amount in a case where the laser output is adjusted by the bead width modification control unit 31 or in a case where the material supply amount is adjusted by the bead height modification control unit 32. Details of the readjustment by the operation amount readjustment unit 33 will be described later.

In a case where the laser output is readjusted, the operation amount readjustment unit 33 outputs a laser output command indicating the readjusted laser output value to the laser oscillator 2. In a case where the laser output is not readjusted, the operation amount readjustment unit 33 outputs a laser output command indicating the value of the laser output input from the bead width modification control unit 31 to the laser oscillator 2. In the case where the material supply amount is adjusted, the operation amount readjustment unit 33 outputs a material supply command indicating the value of the readjusted material supply amount to the material supply device 5. In a case where the material supply amount is not readjusted, the operation amount readjustment unit 33 outputs, to the material supply device 5, a material supply command indicating the value of the material supply amount input from the bead height modification control unit 32.

Next, a relationship between modification of the bead width and modification of the bead height will be described. The modification of the bead width is mainly realized by adjusting the heat source output. The modification of the bead height is mainly realized by adjusting the material supply amount. When the bead width or the bead height is modified, the heat source output or the material supply amount may be constrained from the relationship between the heat source output and the material supply amount.

Figure 3:
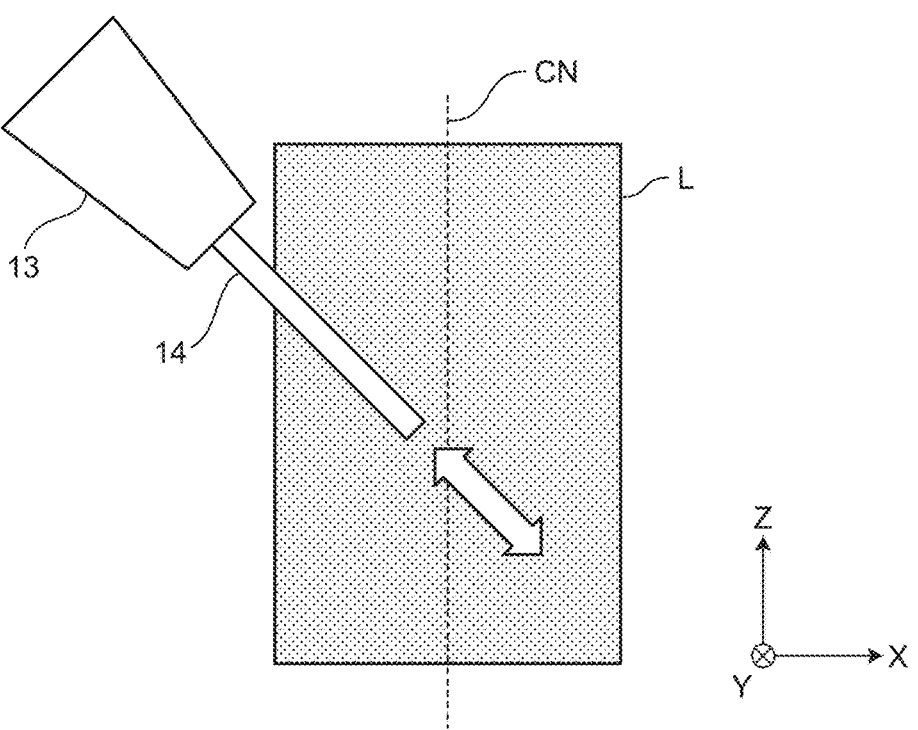
FIG. 3 is a first diagram for explaining a relationship between the laser output and the material supply amount in the additive manufacturing apparatus according to the first embodiment.
Figure 4:
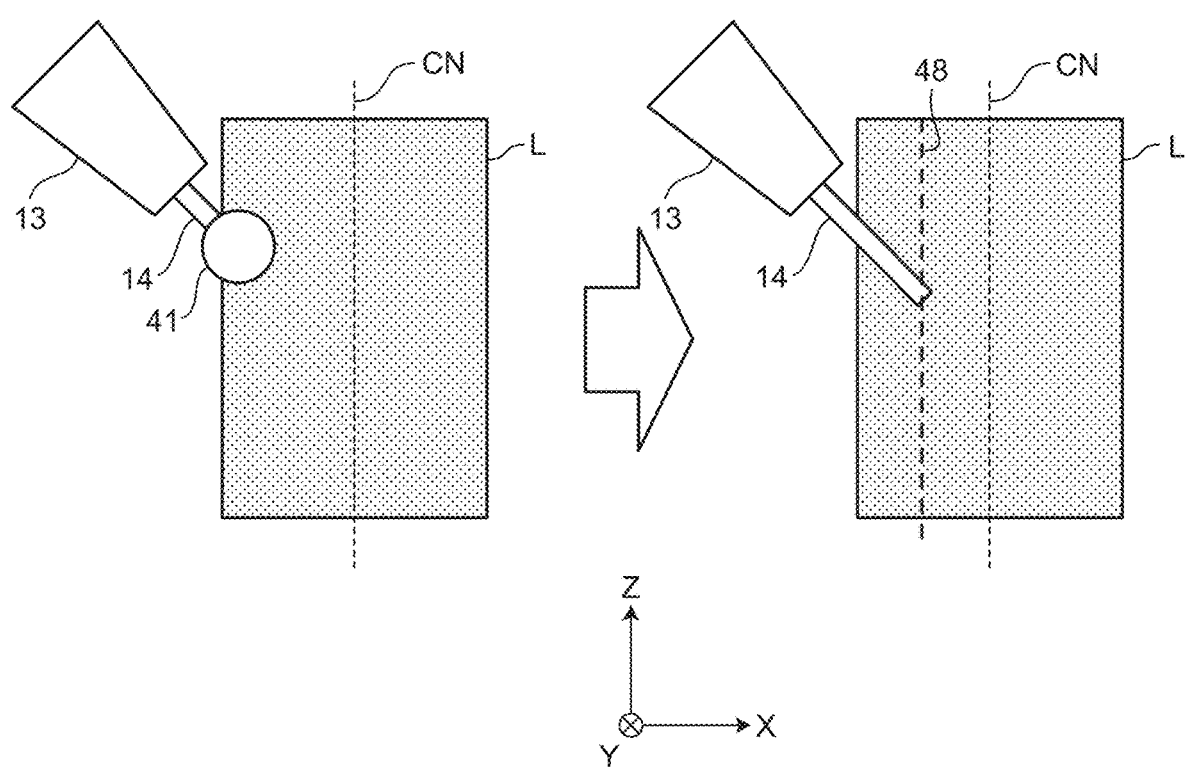
FIG. 4 is a second diagram for explaining a relationship between the laser output and the material supply amount in the additive manufacturing apparatus according to the first embodiment.
Figure 5:
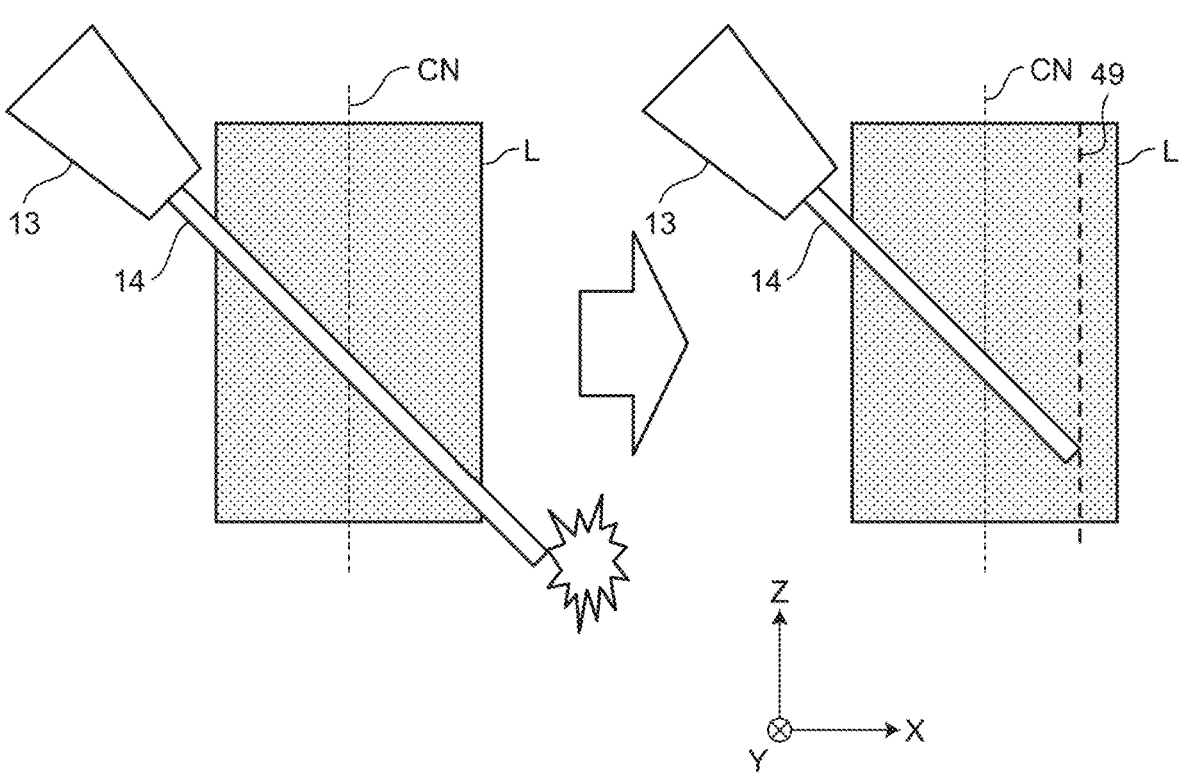
FIG. 5 is a third diagram for explaining a relationship between the laser output and the material supply amount in the additive manufacturing apparatus according to the first embodiment.

FIG. 3 is a first diagram for explaining a relationship between the laser output and the material supply amount in the additive manufacturing apparatus 100 according to the first embodiment. FIG. 4 is a second diagram for explaining a relationship between the laser output and the material supply amount in the additive manufacturing apparatus 100 according to the first embodiment. FIG. 5 is a third diagram for explaining a relationship between the laser output and the material supply amount in the additive manufacturing apparatus 100 according to the first embodiment.

FIGS. 3 to 5 illustrate a state in which the wire 14 enters the laser beam L. At the end of the wire 14 coming out of the material supply nozzle 13, the temperature of the wire 14 reaches the melting point of the wire 14. FIG. 3 illustrates a state in which the end of the wire 14 is near the center line CN of the laser beam L. The position of the end of the wire 14 is determined by the laser output and the material supply amount. The double-headed arrow illustrated in FIG. 3 indicates that the position of the end of the wire 14 changes depending on the laser output and the material supply amount.

When the material supply amount is excessively small with respect to the laser output, the position of the end of the wire 14 gradually approaches the material supply nozzle 13. That is, the end of the wire 14 retracts. The left part of FIG. 4 illustrates a state in which the end of the wire 14 retreats to almost the boundary on the side where the wire 14 enters the laser beam L. In this case, the molten material is not added to the workpiece 19 and remains at the end of the wire 14, which may cause a drop phenomenon in which a drop 41, which is a mass of molten material, remains on the wire 14. When the drop phenomenon occurs, it is difficult for the additive manufacturing apparatus 100 to continue machining by appropriate formation of the bead 16.

In order to avoid the drop phenomenon as illustrated in the left part of FIG. 4, it is necessary to increase the material supply amount or lower the laser output more than those of the state illustrated in the left part of FIG. 4, respectively. For example, suppose that it comes difficult to appropriately form the bead 16 when the position of the end of the wire 14 becomes a position on the minus X direction side with respect to a broken line 48 illustrated in the right part of FIG. 4. In this case, it is necessary to set a constraint on the material supply amount or the laser output such that the position of the end of the wire 14 becomes to be on the plus X direction side with respect to the broken line 48.

On the other hand, when the material supply amount is excessive with respect to the laser output, the position of the end of the wire 14 gradually approaches the direction opposite to the material supply nozzle 13. That is, the end of the wire 14 advances. If the advance of the end of the wire 14 continues, the wire 14 penetrates the laser beam L without melting. The left part of FIG. 5 illustrates a state in which the wire 14 penetrates the laser beam L. In this case, a stub phenomenon may occur in which the wire 14 before melting collides with the workpiece 19. When the stub phenomenon occurs, it is difficult for the additive manufacturing apparatus 100 to continue machining by appropriate formation of the bead 16.

In order to avoid the stub phenomenon as illustrated in the left part of FIG. 5, it is necessary to decrease the material supply amount or increase the laser output more than those of the state illustrated in the left part of FIG. 5, respectively. For example, suppose that it is difficult to appropriately form the bead 16 when the position of the end of the wire 14 becomes a position on the plus X direction side with respect to a broken line 49 illustrated in the right part of FIG. 5. In this case, it is necessary to set a constraint on the material supply amount or the laser output such that the position of the end of the wire 14 becomes to be on the minus X direction side with respect to the broken line 49.

Figure 6:
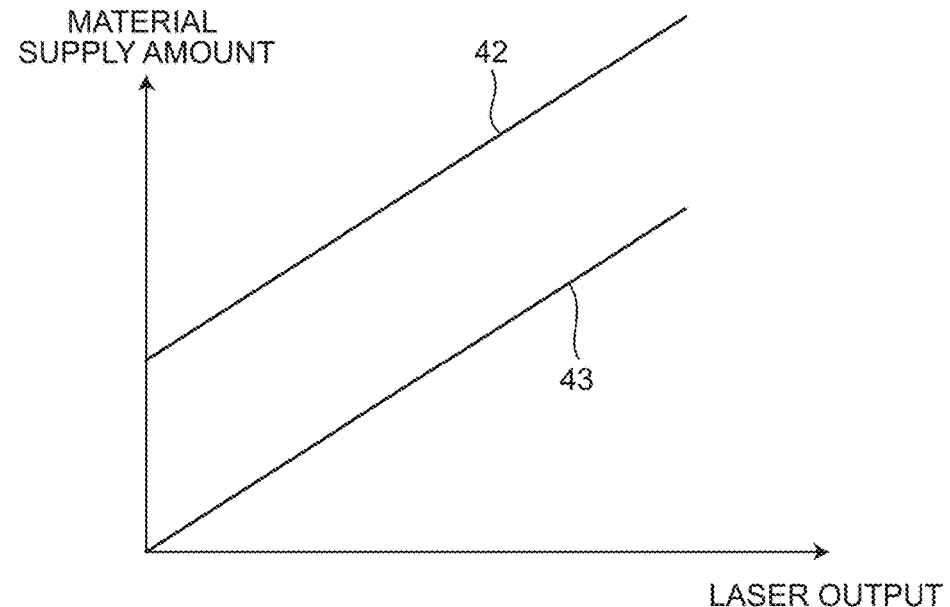
FIG. 6 is a diagram illustrating an example of a relationship between the material supply amount and the laser output with which the end of the wire can be set at an appropriate position in the additive manufacturing apparatus according to the first embodiment.

FIG. 6 is a diagram illustrating an example of a relationship between the material supply amount and the laser output with which the end of the wire 14 can be set at an appropriate position in the additive manufacturing apparatus 100 according to the first embodiment. The appropriate position of the end of the wire 14 is a position of the end of the wire 14 at which the machining can be continued, and is, for example, a position between the broken line 48 illustrated in FIG. 4 and the broken line 49 illustrated in FIG. 5.

In FIG. 6, the relationship between the material supply amount and the laser output is represented by a graph. In FIG. 6, the vertical axis represents the material supply amount, and the horizontal axis represents the laser output. A straight line 42 illustrated in FIG. 6 indicates the relationship between the laser output and the maximum value of the wire speed with which the bead 16 can be appropriately formed. A straight line 43 illustrated in FIG. 6 indicates the relationship between the laser output and the minimum value of the wire speed with which the bead 16 can be appropriately formed. In FIG. 6, a region between the straight line 42 and the straight line 43 represents an appropriate range that is a range of the value of the material supply amount with respect to the value of the laser output with which the bead 16 can be appropriately formed. The appropriate range can also be said to be a range of the value of the laser output with respect to the value of the material supply amount with which the bead 16 can be appropriately formed.

Next, processing that is executed by the operation amount readjustment unit 33 in the first embodiment will be described. The appropriate range, which is a range of the value of the material supply amount with respect to the value of the laser output with which the bead 16 can be appropriately formed, is set in the operation amount readjustment unit 33. If the value of the material supply amount with respect to the value of the laser output is out of the appropriate range after the adjustment by the operation amount adjustment unit, the operation amount readjustment unit 33 selects the material supply amount or the laser output as the operation amount to be preferentially adjusted, and preferentially readjusts the selected operation amount. That is, the operation amount readjustment unit 33 preferentially readjusts the selected operation amount when the value of the material supply amount with respect to the value of the laser output is out of the appropriate range after the adjustment of the laser output by the bead width modification control unit 31 or after the adjustment of the material supply amount by the bead height modification control unit 32. Furthermore, when the allowable error amount is set in the parameter input unit 34, the operation amount readjustment unit 33 readjusts the laser output and the material supply amount by consideration of the set allowable error amount.

In the first embodiment, the operation amount readjustment unit 33 selects the operation amount to be preferentially adjusted and readjusts the selected operation amount in a case where the material supply amount becomes excessive with respect to the laser output due to the adjustment of the laser output by the bead width modification control unit 31 or the adjustment of the material supply amount by the bead height modification control unit 32.

Figure 7:
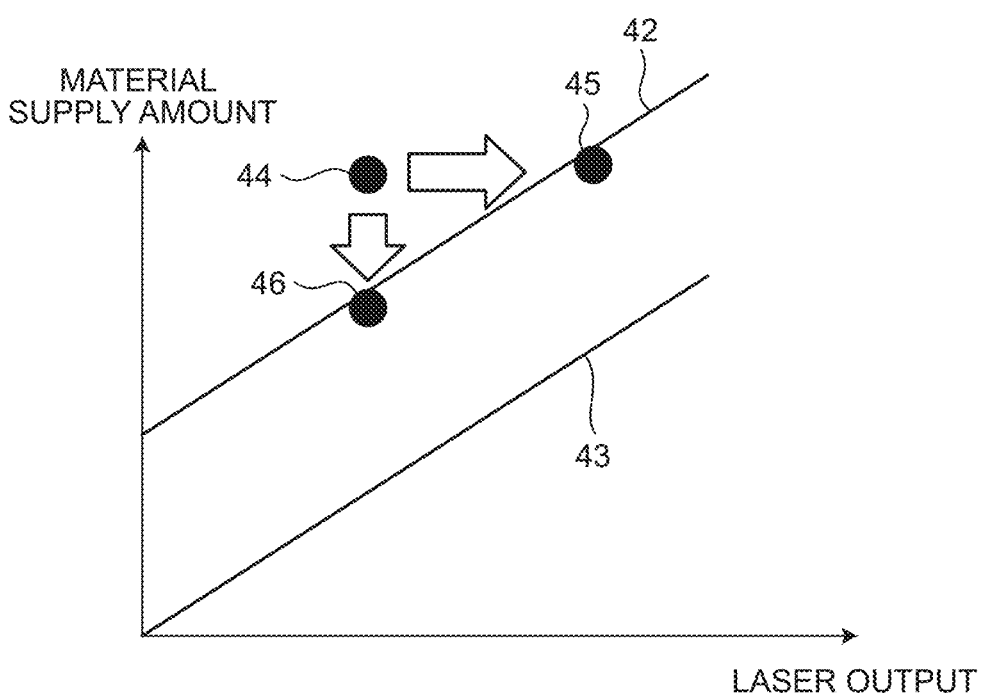
FIG. 7 is a first diagram for explaining selection of an operation amount to be preferentially adjusted by the operation amount readjustment unit of the additive manufacturing apparatus according to the first embodiment.

FIG. 7 is a first diagram for explaining selection of an operation amount to be preferentially adjusted by the operation amount readjustment unit 33 of the additive manufacturing apparatus 100 according to the first embodiment. In FIG. 7, the relationship between the material supply amount and the laser output is represented by a graph similarly to FIG. 6. The points shown in the graph of FIG. 7 represent a set of the value of the laser output and the value of the material supply amount.

A point 44 illustrated in FIG. 7 represents an example of a set of the value of the laser output and the value of the material supply amount after the adjustment of the laser output by the bead width modification control unit 31 or after the adjustment of the material supply amount by the bead height modification control unit 32. The value of the laser output and the value of the material supply amount indicated by the point 44 are outside the appropriate range. In FIG. 7, the point 44 is above the straight line 42. This indicates that the value of the material supply amount exceeds the maximum value of the material supply amount at which the bead 16 can be appropriately formed.

In order to keep the value of the laser output and the value of the material supply amount within the appropriate range, for example, it is conceivable to perform readjustment of transitioning the set of the value of the laser output and the value of the material supply amount from the point 44 to the point 45 or readjustment of transitioning the set of the value of the laser output and the value of the material supply amount from the point 44 to the point 46. The transition from the point 44 to the point 45 means that the material supply amount is not changed and the laser output is increased. The transition from the point 44 to the point 46 means that the laser output is not changed and the material supply amount is reduced.

Figure 8:
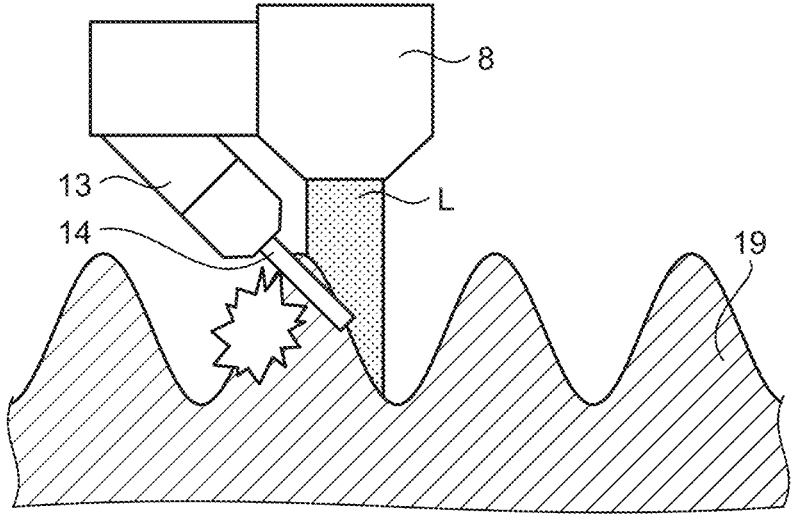
FIG. 8 is a second diagram for explaining selection of an operation amount to be preferentially adjusted by the operation amount readjustment unit of the additive manufacturing apparatus according to the first embodiment.

FIG. 8 is a second diagram for explaining selection of an operation amount to be preferentially adjusted by the operation amount readjustment unit 33 of the additive manufacturing apparatus 100 according to the first embodiment. Here, a first example of a phenomenon that can occur in a case where readjustment is performed to reduce the material supply amount without increasing the laser output will be described. When the material supply amount is reduced, the error in the bead height is not modified, which leads to an increase in the error in the bead height as the machining is continued.

FIG. 8 schematically illustrates a state in which unevenness is generated on the upper surface of the workpiece 19 due to an error in bead height. Due to the generation of the unevenness, a portion inclined with respect to the horizontal direction is generated on the upper surface of the workpiece 19. When the inclination is larger than the inclination of the wire 14 with respect to the horizontal direction, as illustrated in FIG. 8, interference of the wire 14 or the material supply nozzle 13 with the workpiece 19 may occur. When interference of the wire 14 or the material supply nozzle 13 with the workpiece 19 occurs, machining tends to be unstable.

Figure 9:
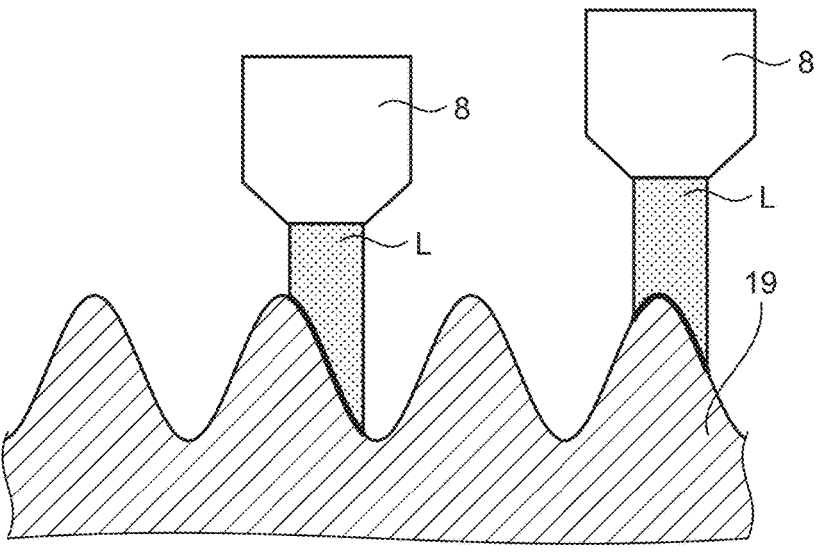
FIG. 9 is a third diagram for explaining selection of an operation amount to be preferentially adjusted by the operation amount readjustment unit of the additive manufacturing apparatus according to the first embodiment.

FIG. 9 is a third diagram for explaining selection of an operation amount to be preferentially adjusted by the operation amount readjustment unit 33 of the additive manufacturing apparatus 100 according to the first embodiment. Here, a second example of a phenomenon that can occur in a case where readjustment is performed to reduce the material supply amount without increasing the laser output will be described. Also in FIG. 9, similarly to the case illustrated in FIG. 8, it is assumed that unevenness is generated on the upper surface of the workpiece 19. FIG. 9 schematically illustrates the irradiation state of the laser beam L in each of portions having different magnitudes of inclination with respect to the horizontal direction.

As illustrated in FIG. 9, the area of the molten portion in the workpiece 19 varies between portions having different magnitudes of inclination. The larger the inclination, the larger the area of the molten portion. If the area of the molten portion changes while the bead 16 is being formed, machining tends to become unstable. In a case where the width of the laser beam L is adjusted so that the area of the molten portion is constant, the fluctuation of the laser output becomes large.

As described above, in a case where the material supply amount is excessive with respect to the laser output, if the additive manufacturing apparatus 100 performs readjustment to reduce the material supply amount without increasing the laser output, machining tends to be unstable. The additive manufacturing apparatus 100 may have difficulty in continuing machining due to unstable machining.

On the other hand, in a case where readjustment is performed to increase the laser output without decreasing the material supply amount, the bead width increases by increasing the laser output. In this case, it is possible to avoid the above-described phenomenon that makes continuation of machining difficult. As the bead width increases, the shape of the object may become larger than the target shape. In this case, the shape of the object can be modified through cutting that is performed after the additive manufacturing machining.

From the above, in a case where the material supply amount is excessive with respect to the laser output, the operation amount readjustment unit 33 prioritizes the adjustment of increasing the laser output over the adjustment of decreasing the material supply amount. That is, when the value of the material supply amount is larger than the maximum value of the appropriate range, the operation amount readjustment unit 33 selects the laser output as the operation amount to be preferentially adjusted.

For example, the operation amount readjustment unit 33 does not perform the readjustment of transitioning from the point 44 to the point 46 in FIG. 7 but performs the readjustment of transitioning from the point 44 to the point 45 in FIG. 7 for the set of the value of the laser output and the value of the material supply amount. As a result, the additive manufacturing apparatus 100 can prevent continuation of machining from becoming difficult due to readjustment of the operation amount.

Figure 10:
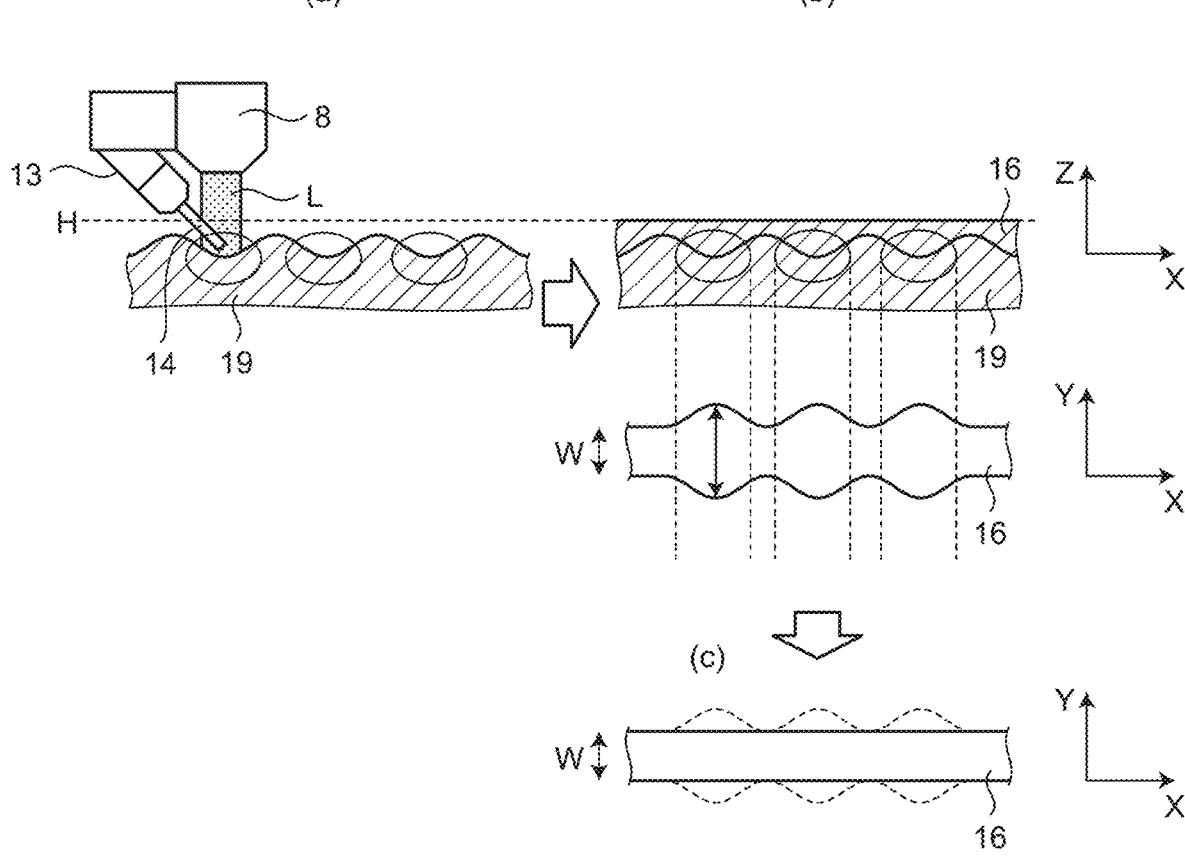
FIG. 10 is a first diagram for explaining readjustment of an operation amount by the operation amount readjustment unit of the additive manufacturing apparatus according to the first embodiment.

FIG. 10 is a first diagram for explaining readjustment of an operation amount by the operation amount readjustment unit 33 of the additive manufacturing apparatus 100 according to the first embodiment. The operation amount readjustment unit 33 readjusts laser output, which is an operation amount to be preferentially adjusted. FIG. 10 illustrates an example in which an allowable error amount that is an acceptable bead height error is not set. That is, in the example illustrated in FIG. 10, the operation amount readjustment unit 33 readjusts the laser output so as to make the bead height error zero.

FIG. 10 (*a*) illustrates a state before the bead 16 is formed on the workpiece 19. It is assumed that unevenness due to an error in bead height is generated on the upper surface of the workpiece 19 illustrated in FIG. 10 (*a*). The bead height modification control unit 32 adjusts the material supply amount indicated by the material supply command based on the bead height error amount, and outputs the adjusted value of the material supply amount to the operation amount readjustment unit 33. The bead width modification control unit 31 outputs the value of the laser output indicated by the laser output command to the operation amount readjustment unit 33.

Here, it is assumed that the value of the material supply amount input to the operation amount readjustment unit 33 is larger than the maximum value of the appropriate range. By determining that the value of the material supply amount is larger than the maximum value of the appropriate range, the operation amount readjustment unit 33 selects the laser output as the operation amount to be preferentially adjusted. The operation amount readjustment unit 33 performs readjustment to increase the laser output, which is the selected operation amount. Specifically, the operation amount readjustment unit 33 performs readjustment to increase the laser output in recessed portions surrounded by ellipses in FIG. 10 (*a*) such that a large amount of molten material is supplied to the portions. In this case, the adjustment performed by the operation amount readjustment unit 33 is an adjustment that gives priority to bringing the bead height close to the target value over bringing the laser width close to the target value.

FIG. 10 (*b*) illustrates a state after the bead 16 is formed on the workpiece 19 from the state illustrated in FIG. 10 (*a*). FIG. 10 (*b*) illustrates an XZ cross section of the workpiece 19 and the bead 16 and an XY plane of the bead 16. In the XZ cross section illustrated in FIG. 10 (*b*), the height of the upper surface of the bead 16 is leveled at H which is a target value of the bead height. The additive manufacturing apparatus 100 can make the bead height error zero by readjusting the laser output in the operation amount readjustment unit 33.

In addition, as the laser output in the portions surrounded by ellipses in FIG. 10 (*b*) increases, the Y-direction width in the portions on the XY plane of the bead 16 enlarges. In the XY plane of the bead 16 illustrated in FIG. 10 (*b*), the Y-direction width of the portions is larger than W which is the target value of the bead width.

FIG. 10 (*c*) illustrates a state after cutting is performed on the bead 16 from the state illustrated in FIG. 10 (*b*). FIG. 10 (*c*) illustrates an example in which portions having a width exceeding W in the bead 16 are removed by cutting. The broken lines illustrated in FIG. 10 (*c*) represent the contours of the bead 16 before cutting illustrated in FIG. 10 (*b*). Thus, the shape of the object 17 can be modified by cutting, which is post-machining. FIG. 10 (*c*) illustrates a case where the bead 16 is cut such that the width of the bead 16 becomes W, but the way of cutting may be anything. The cutting only needs to be performed to modify the contour of the object 17 obtained by additive manufacturing machining. As described above, the additive manufacturing apparatus 100 can prevent continuation of machining from becoming difficult, and can manufacture the object 17 with reduced shape error.

Figure 11:
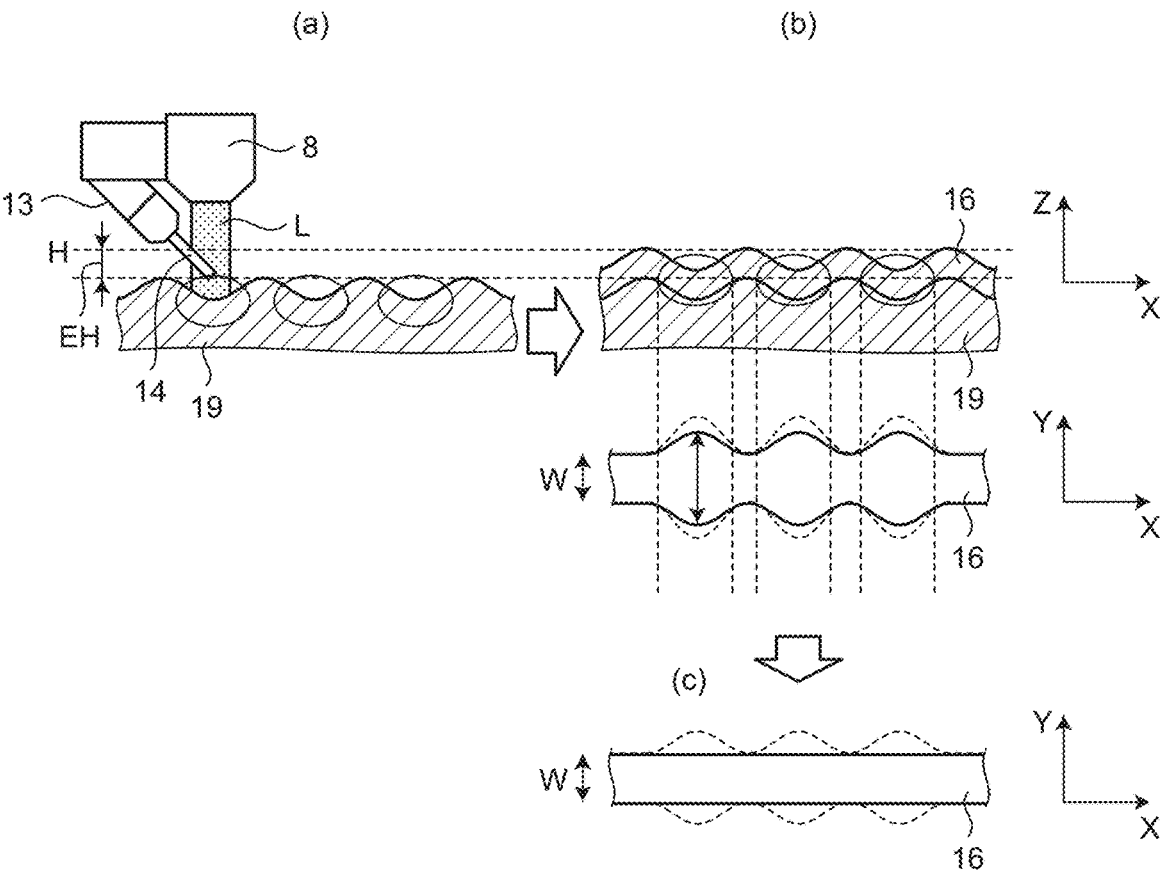
FIG. 11 is a second diagram for explaining readjustment of an operation amount by the operation amount readjustment unit of the additive manufacturing apparatus according to the first embodiment.

FIG. 11 is a second diagram for explaining readjustment of an operation amount by the operation amount readjustment unit 33 of the additive manufacturing apparatus 100 according to the first embodiment. FIG. 11 illustrates an example in which an allowable error amount that is an acceptable bead height error is set. In the example illustrated in FIG. 11, the operation amount readjustment unit 33 readjusts the material supply amount such that the bead height error matches the allowable error amount, and further readjusts the laser output based on the readjusted material supply amount. The operation amount readjustment unit 33 not only readjusts the laser output, which is the operation amount to be preferentially adjusted, but also readjusts the material supply amount, which is the operation amount other than the operation amount to be preferentially adjusted.

In the example illustrated in FIG. 11, the operation amount readjustment unit 33 lowers the priority of adjusting the bead height as compared with the case illustrated in FIG.

10, thereby reducing the increase in the laser output as compared with the case illustrated in FIG. 10. By reducing the increase in the laser output, the enlargement of the bead width due to the readjustment of the laser output is alleviated as compared with the case illustrated in FIG. 10. Such adjustment enables the additive manufacturing apparatus 100 to keep the bead height error within the allowable error amount. In addition, since the enlargement of the bead width is alleviated, the amount of cutting in the cutting can be reduced. Since the amount of cutting can be reduced, the time required for cutting can be shortened.

FIG. 11 (*a*) illustrates a state before the bead 16 is formed on the workpiece 19. It is assumed that unevenness due to an error in bead height is generated on the upper surface of the workpiece 19 illustrated in FIG. 11 (*a*). The bead height modification control unit 32 adjusts the material supply amount indicated by the material supply command based on the bead height error amount, and outputs the adjusted value of the material supply amount to the operation amount readjustment unit 33. The bead width modification control unit 31 outputs the value of the laser output indicated by the laser output command to the operation amount readjustment unit 33.

Here, it is assumed that the value of the material supply amount input to the operation amount readjustment unit 33 is larger than the maximum value of the appropriate range. By determining that the value of the material supply amount is larger than the maximum value of the appropriate range, the operation amount readjustment unit 33 selects the laser output as the operation amount to be preferentially adjusted similarly to the case illustrated in FIG. 10.

In the example illustrated in FIG. 11, the allowable error amount set in the parameter input unit 34 is input to the operation amount readjustment unit 33. The operation amount readjustment unit 33 readjusts the material supply amount such that the bead height error matches the allowable error amount. In addition, the operation amount readjustment unit 33 performs readjustment to increase the value of the laser output such that the value of the material supply amount after readjustment becomes equal to or less than the maximum value of the appropriate range in relation to the laser output. In this manner, the operation amount readjustment unit 33 readjusts the laser output and the material supply amount by consideration of the set allowable error amount.

FIG. 11 (*b*) illustrates a state after the bead 16 is formed on the workpiece 19 from the state illustrated in FIG. 11 (*a*). FIG. 11 (*b*) illustrates an XZ cross section of the workpiece 19 and the bead 16 and the upper surface of the bead 16. In the XZ cross section illustrated in FIG. 11 (*b*), the bead height error which is the height error of the upper surface of the bead 16 matches EH, the allowable error amount. Thus, the bead height error corresponding to the allowable error amount remains in the bead 16 by the readjustment of the material supply amount in the operation amount readjustment unit 33.

In addition, as the laser output in the portions surrounded by ellipses in FIG. 11 (*b*) increases, the Y-direction width in the portions on the XY plane of the bead 16 enlarges. However, since the increase in the laser output is smaller than that in the case illustrated in FIG. 10 (*b*), the degree of enlargement of the bead width is smaller than that in the case illustrated in FIG. 10 (*b*). The broken lines illustrated in FIG. 11 (*b*) indicate the contours of the bead 16 in the case illustrated in FIG. 10 (*b*) as a reference.

FIG. 11 (*c*) illustrates a state after cutting is performed on the bead 16 from the state illustrated in FIG. 11 (*b*). FIG. 11

(c) illustrates an example in which portions having a width exceeding W in the bead 16 are removed by cutting. The broken lines illustrated in FIG. 11 (c) represent the contours of the bead 16 before cutting illustrated in FIG. 11 (b). In the example illustrated in FIG. 11, the amount of cutting in the cutting is reduced since the enlargement of the bead width is alleviated as compared with the example illustrated in FIG. 10.

Figure 12:
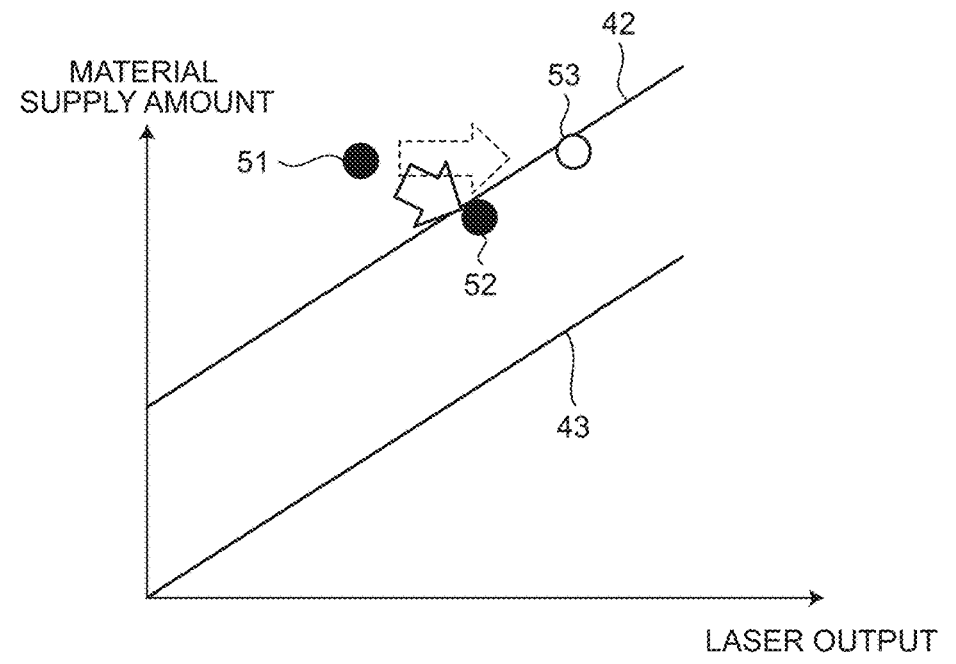
FIG. 12 is a diagram for explaining readjustment of an operation amount in a case where an allowable error amount is set in the first embodiment.

FIG. 12 is a diagram for explaining readjustment of an operation amount in which an allowable error amount is set in the first embodiment. In FIG. 12, the relationship between the material supply amount and the laser output is represented by a graph similarly to FIG. 6. The points shown in the graph of FIG. 12 represent a set of the value of the laser output and the value of the material supply amount.

A point 51 illustrated in FIG. 12 represents an example of a set of the value of the laser output and the value of the material supply amount after the adjustment of the laser output by the bead width modification control unit 31 or after the adjustment of the material supply amount by the bead height modification control unit 32. In the set represented by the point 51, the value of the material supply amount exceeds the maximum value of the material supply amount at which the bead 16 can be appropriately formed.

A point 53 illustrated in FIG. 12 represents an example of a set of the value of the laser output and the value of the material supply amount after readjustment in which the allowable error amount of the beam height error is not set. The transition from the point 51 to the point 53 in FIG. 12 represents a readjustment that does not change the material supply amount and increases the laser output.

A point 52 illustrated in FIG. 12 represents an example of a set of the value of the laser output and the value of the material supply amount after readjustment in which the allowable error amount of the beam height error is set. The transition from the point 51 to the point 52 in FIG. 12 represents a readjustment that reduces the material supply amount and increases the laser output. The increase in the laser output in the transition from the point 51 to the point 52 is smaller than the increase in the laser output in the transition from the point 51 to the point 53. As described above, the additive manufacturing apparatus 100 sets the allowable error amount of the bead height error, thereby reducing the increase in the laser output. The additive manufacturing apparatus 100 can alleviate the enlargement of the bead width by reducing the increase in the laser output.

The additive manufacturing apparatus 100 can reduce the bead height error in both the case where the allowable error amount is set and the case where the allowable error amount is not set. The additive manufacturing apparatus 100 can make the bead height error zero when the allowable error amount is not set. When the allowable error amount is set, the additive manufacturing apparatus 100 can keep the bead height error within the allowable error amount and can alleviate the enlargement of the bead width.

Figure 13:
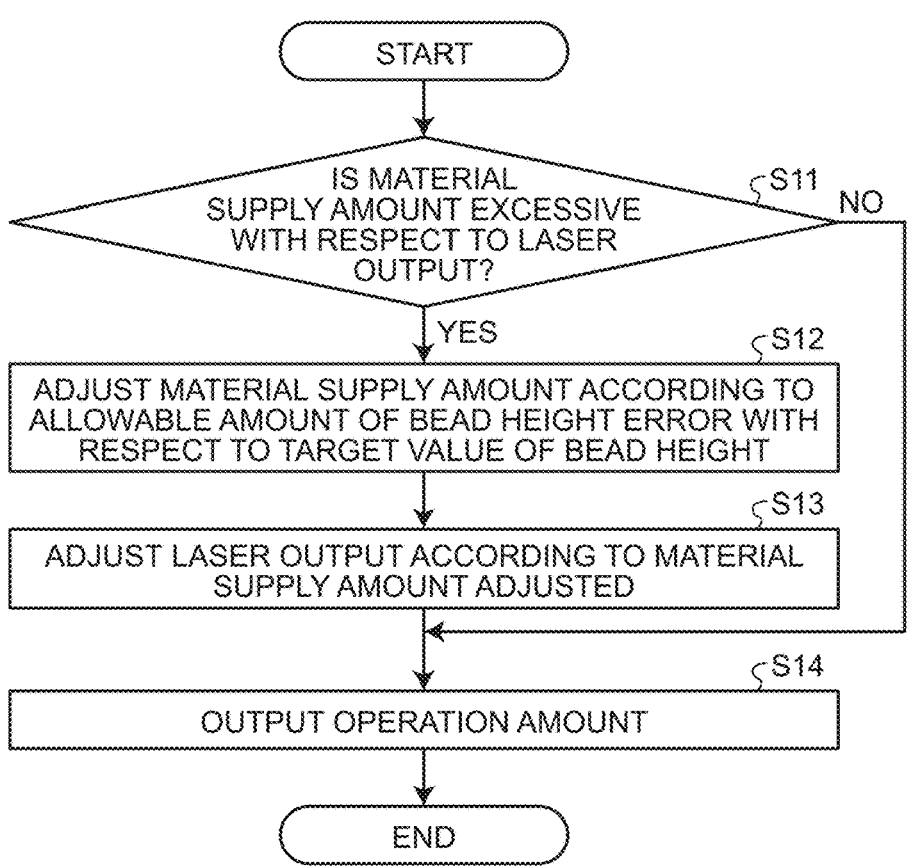
FIG. 13 is a flowchart illustrating an example of a procedure of processing by the operation amount readjustment unit of the additive manufacturing apparatus according to the first embodiment.

Next, a procedure of processing by the operation amount readjustment unit 33 will be described. FIG. 13 is a flowchart illustrating an example of a procedure of processing by the operation amount readjustment unit 33 of the additive manufacturing apparatus 100 according to the first embodiment. FIG. 13 illustrates an example of a processing procedure in a case where the allowable error amount of the beam height error is set.

The bead width modification control unit 31 adjusts the laser output based on the bead width error. The bead width modification control unit 31 outputs the value of the laser output. The bead height modification control unit 32 adjusts the material supply amount based on the bead height error. The bead height modification control unit 32 outputs the value of the material supply amount. The value of the laser output and the value of the material supply amount are input to the operation amount readjustment unit 33.

In step S11, the operation amount readjustment unit 33 determines whether the material supply amount is excessive with respect to the laser output. When the value of the material supply amount is larger than the maximum value of the appropriate range, the operation amount readjustment unit 33 determines that the material supply amount is excessive with respect to the laser output. In response to determining that the material supply amount is excessive with respect to the laser output (step S11, Yes), the operation amount readjustment unit 33 advances the procedure to step S12. On the other hand, in response to determining that the material supply amount is not excessive with respect to the laser output (step S11, No), the operation amount readjustment unit 33 advances the procedure to step S14.

In step S12, the operation amount readjustment unit 33 adjusts the material supply amount according to the allowable amount of the bead height error with respect to the target value of the bead height. The operation amount readjustment unit 33 performs an adjustment to reduce the material supply amount such that the bead height error matches the allowable error amount.

In step S13, the operation amount readjustment unit 33 adjusts the laser output according to the material supply amount adjusted in step S12. The operation amount readjustment unit 33 performs adjustment to increase the laser output such that the value of the material supply amount becomes equal to or less than the maximum value of the appropriate range in the relationship between the laser output and the material supply amount.

In step S14, the operation amount readjustment unit 33 outputs the operation amount. That is, the operation amount readjustment unit 33 outputs the value of the laser output, which is the operation amount, and the value of the material supply amount, which is the operation amount. The operation amount readjustment unit 33 outputs a laser output command indicating the readjusted laser output value to the laser oscillator 2. The operation amount readjustment unit 33 outputs a material supply command indicating the readjusted material supply amount value to the material supply device 5. Then, the operation amount readjustment unit 33 ends the processing according to the procedure illustrated in FIG. 13.

In the above description, when the value of the material supply amount input to the operation amount readjustment unit 33 is larger than the maximum value of the appropriate range, the operation amount readjustment unit 33 performs readjustment by prioritizing the laser output over the material supply amount. That is, the adjustment performed by the operation amount readjustment unit 33 is an adjustment that gives priority to bringing the bead height close to the target value over bringing the bead width close to the target value. In the first embodiment, when the value of the material supply amount input to the operation amount readjustment unit 33 is larger than the maximum value of the appropriate range, the operation amount readjustment unit 33 may perform readjustment by prioritizing the material supply amount over the laser output. That is, the adjustment performed by the operation amount readjustment unit 33 may be an adjustment that gives priority to bringing the bead width close to the target value over bringing the bead height close to the target value. For example, by setting an excessive value as the allowable error amount which is an acceptable bead height error, the operation amount readjustment unit 33 may readjust only the material supply amount without readjusting the laser output. The additive manufacturing apparatus 100 can freely adjust the ratio between the adjustment of the bead height and the adjustment of the bead width by freely setting the allowable error amount.

According to the first embodiment, when the value of the material supply amount with respect to the value of the laser output is out of the appropriate range after the adjustment of the material supply amount or the laser output in the operation amount adjustment unit, the operation amount readjustment unit 33 selects one of the material supply amount or the laser output as the operation amount to be preferentially adjusted. The operation amount readjustment unit 33 preferentially readjusts the selected operation amount. When the value of the material supply amount is larger than the maximum value of the appropriate range, the operation amount readjustment unit 33 selects the laser output as the operation amount to be preferentially adjusted. The additive manufacturing apparatus 100 can reduce the shape error of the bead 16 by adjusting the material supply amount or the laser output in the operation amount adjustment unit, and can prevent continuation of machining from becoming difficult by readjustment of the operation amount in the operation amount readjustment unit 33. Thus, the additive manufacturing apparatus 100 can achieve the effect of manufacturing the object 17 with reduced error.

Second Embodiment

The first embodiment has described a case where the material supply amount becomes excessive with respect to the laser output due to the adjustment of the laser output by the bead width modification control unit 31 or the adjustment of the material supply amount by the bead height modification control unit 32. The second embodiment describes processing of the operation amount readjustment unit 33 in a case where the material supply amount becomes excessively small with respect to the laser output due to the adjustment of the laser output by the bead width modification control unit 31 or the adjustment of the material supply amount by the bead height modification control unit 32.

The additive manufacturing apparatus 100 according to the second embodiment has a configuration similar to that of the additive manufacturing apparatus 100 illustrated in FIG. 1. In addition, the additive manufacturing apparatus 100 according to the second embodiment has a functional configuration similar to the functional configuration illustrated in FIG. 2. In the second embodiment, components identical to those in the first embodiment are denoted by the same reference signs, and configuration differences from the first embodiment will be mainly described.

In the second embodiment, the operation amount readjustment unit 33 selects the operation amount to be preferentially adjusted and readjusts the selected operation amount in a case where the material supply amount becomes excessively small with respect to the laser output due to the adjustment of the laser output by the bead width modification control unit 31 or the adjustment of the material supply amount by the bead height modification control unit 32.

Furthermore, when the allowable error amount is set in the parameter input unit 34, the operation amount readjustment unit 33 readjusts the laser output and the material supply amount by consideration of the set allowable error amount. In the second embodiment, the allowable error amount is an acceptable value of bead width error. In the second embodiment, the value of the acceptable bead width error is input to the parameter input unit 34. Through input of the allowable error amount to the parameter input unit 34, the allowable error amount is set in the additive manufacturing apparatus 100.

Figure 14:
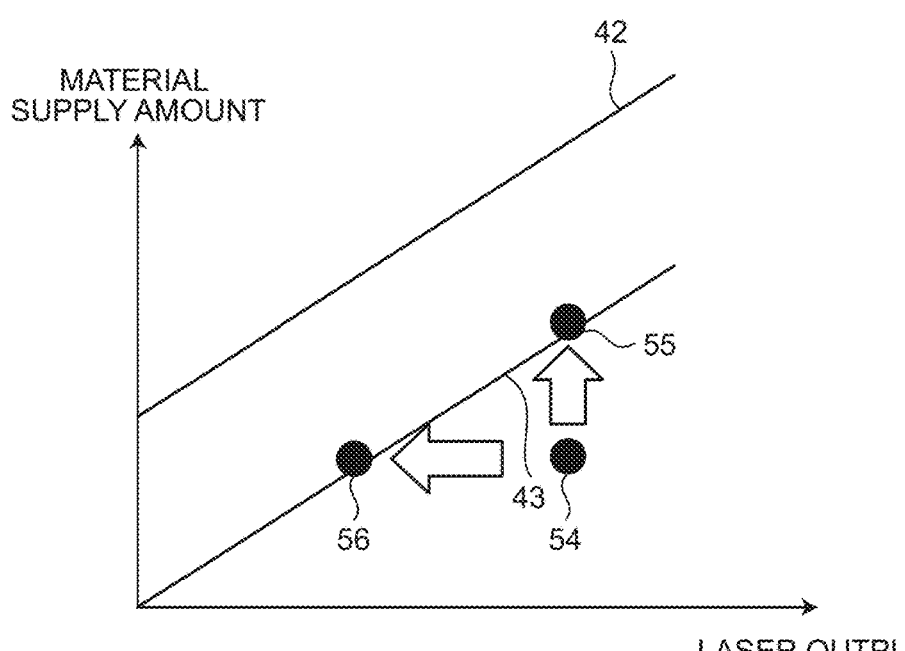
FIG. 14 is a diagram for explaining selection of an operation amount to be preferentially adjusted by the operation amount readjustment unit of the additive manufacturing apparatus according to the second embodiment.

FIG. 14 is a diagram for explaining selection of an operation amount to be preferentially adjusted by the operation amount readjustment unit 33 of the additive manufacturing apparatus 100 according to the second embodiment. In FIG. 14, the relationship between the material supply amount and the laser output is represented by a graph similarly to FIG. 6. The points shown in the graph of FIG. 14 represent a set of the value of the laser output and the value of the material supply amount.

A point 54 illustrated in FIG. 14 represents an example of a set of the value of the laser output and the value of the material supply amount after the adjustment of the laser output by the bead width modification control unit 31 or after the adjustment of the material supply amount by the bead height modification control unit 32. The value of the laser output and the value of the material supply amount indicated by the point 54 are outside the appropriate range. In FIG. 14, the point 54 is below the straight line 43. This indicates that the value of the material supply amount is smaller than the minimum value of the material supply amount at which the bead 16 can be appropriately formed.

In order to keep the value of the laser output and the value of the material supply amount within the appropriate range, for example, it is conceivable to perform readjustment of transitioning the set of the value of the laser output and the value of the material supply amount from the point 54 to the point 55 or readjustment of transitioning the set of the value of the laser output and the value of the material supply amount from the point 54 to the point 56. The transition from the point 54 to the point 55 means that the laser output is not changed and the material supply amount is increased. The transition from the point 54 to the point 56 means that the material supply amount is not changed and the laser output is reduced.

In a case where the material supply amount is excessively small with respect to the laser output, if the laser output is reduced, the bead width becomes so small that a defect may occur in the object 17. In the additive manufacturing machining, defect occurrence may be more likely to make continuation of machining difficult than remaining error in the bead height. In the second embodiment, the operation amount readjustment unit 33 prioritizes the adjustment of increasing the material supply amount over the adjustment of decreasing the laser output in a case where the material supply amount is excessively small with respect to the laser output. That is, when the value of the material supply amount is smaller than the minimum value of the appropriate range, the operation amount readjustment unit 33 selects the material supply amount as the operation amount to be preferentially adjusted.

For example, the operation amount readjustment unit 33 does not perform the readjustment of transitioning from the point 54 to the point 56 in FIG. 14 but performs the readjustment of transitioning from the point 54 to the point 55 in FIG. 14 for the set of the value of the laser output and the value of the material supply amount. Thus, the additive manufacturing apparatus 100 can prevent adverse effects due to the occurrence of defects in the object 17.

Figure 15:
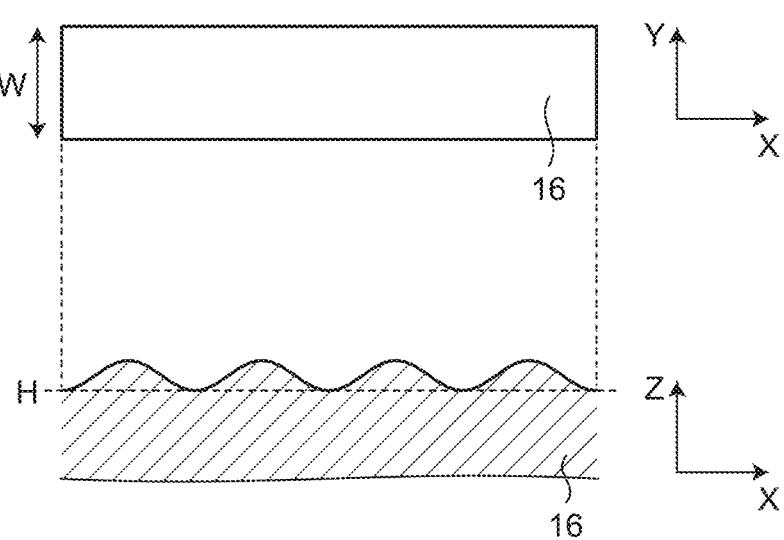
FIG. 15 is a first diagram for explaining readjustment of an operation amount by the operation amount readjustment unit of the additive manufacturing apparatus according to the second embodiment.

FIG. 15 is a first diagram for explaining readjustment of an operation amount by the operation amount readjustment unit 33 of the additive manufacturing apparatus 100 according to the second embodiment. The operation amount readjustment unit 33 readjusts the material supply amount, which is an operation amount to be preferentially adjusted. FIG. 15 illustrates an example in which an allowable error amount that is an acceptable bead width error is not set. That is, in the example illustrated in FIG. 15, the operation amount readjustment unit 33 readjusts the laser output so as to make the bead width error zero.

FIG. 15 illustrates a state after the bead 16 is formed on the workpiece 19. FIG. 15 illustrates an XY plane of the bead 16 and an XZ cross section of the bead 16. In the XY plane of the bead 16 illustrated in FIG. 15, the width of the bead 16 is equalized by W, and W is the target value of the bead width. The additive manufacturing apparatus 100 can make the bead width error zero by readjusting the laser output in the operation amount readjustment unit 33.

In addition, as the material supply amount increases, a portion where the bead 16 is higher than H, which is the target value of the bead height, occurs in the XZ cross section illustrated in FIG. 15. As the bead height error increases, machining tends to be unstable as described in the first embodiment. The operation amount readjustment unit 33 sets an allowable error amount which is an acceptable bead width error, thereby making it possible to prevent an increase in the bead height error.

Figure 16:
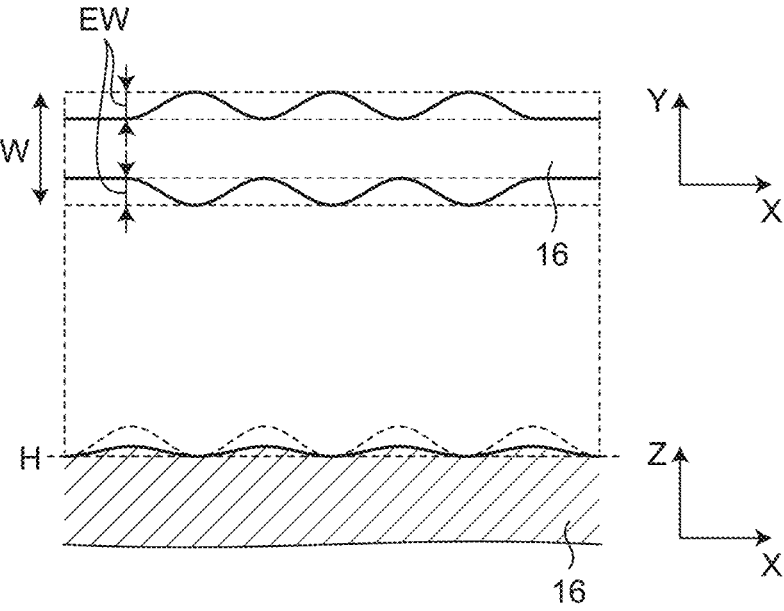
FIG. 16 is a second diagram for explaining readjustment of an operation amount by the operation amount readjustment unit of the additive manufacturing apparatus according to the second embodiment.

FIG. 16 is a second diagram for explaining readjustment of an operation amount by the operation amount readjustment unit 33 of the additive manufacturing apparatus 100 according to the second embodiment. FIG. 16 illustrates an example in which an allowable error amount that is an acceptable bead width error is set. In the example illustrated in FIG. 16, the operation amount readjustment unit 33 readjusts the laser output such that the bead width error matches the allowable error amount, and further readjusts the material supply amount based on the readjusted laser output. The operation amount readjustment unit 33 not only readjusts the material supply amount, which is the operation amount to be preferentially adjusted, but also readjusts the laser output, which is the operation amount other than the operation amount to be preferentially adjusted.

In the example illustrated in FIG. 16, the operation amount readjustment unit 33 lowers the priority of adjusting the bead width as compared with the case illustrated in FIG. 15, thereby reducing the increase in the material supply amount as compared with the case illustrated in FIG. 15. By reducing the increase in the material supply amount, the enlargement of the bead height due to the readjustment of the material supply amount is alleviated as compared with the case illustrated in FIG. 15. Such adjustment enables the additive manufacturing apparatus 100 to keep the bead width error within the allowable error amount. In addition, the additive manufacturing apparatus 100 can reduce the bead height error by alleviating the enlargement of the bead height.

FIG. 16 illustrates a state after the bead 16 is formed on the workpiece 19. FIG. 16 illustrates an XY plane of the bead 16 and an XZ cross section of the bead 16. On the upper surface of the bead 16 illustrated in FIG. 16, a bead width error that is an error in the width of the bead 16 matches EW, the allowable error amount. Thus, the bead width error corresponding to the allowable error amount remains in the bead 16 by the readjustment of the laser output in the operation amount readjustment unit 33.

In addition, by readjusting the material supply amount, the degree of enlargement of the bead height becomes smaller than that in the case illustrated in FIG. 15. The broken line on the XZ cross section illustrated in FIG. 16 represents the upper surface of the bead 16 in the case illustrated in FIG. 15. The additive manufacturing apparatus

100 can reduce the bead height error by reducing the degree of enlargement of the bead height.

Figure 17:
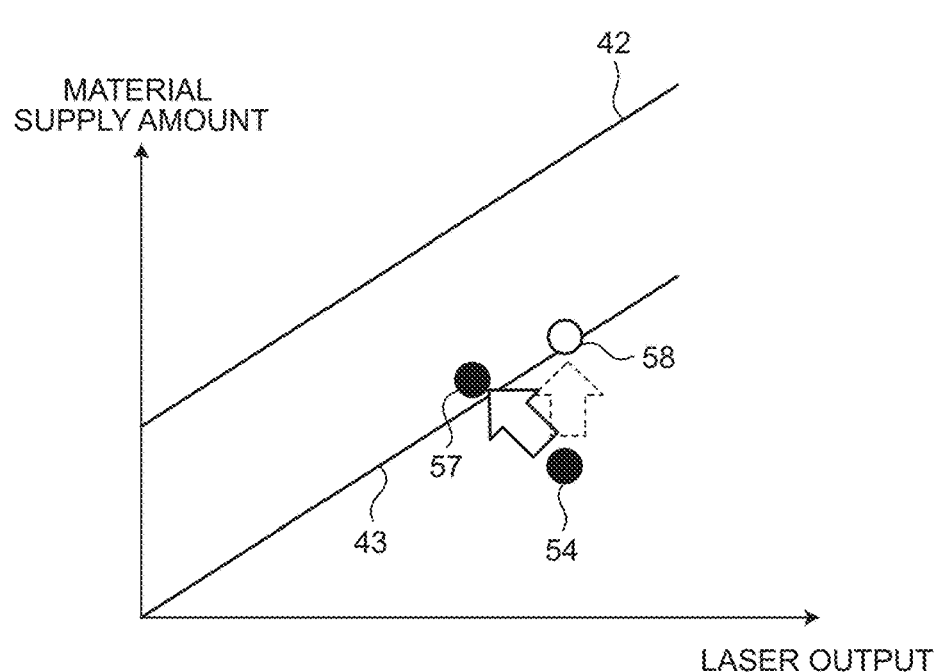
FIG. 17 is a diagram for explaining readjustment of an operation amount in a case where an allowable error amount is set in the second embodiment.

FIG. 17 is a diagram for explaining readjustment of an operation amount in a case where an allowable error amount is set in the second embodiment. In FIG. 17, the relationship between the material supply amount and the laser output is represented by a graph similarly to FIG. 6. The points shown in the graph of FIG. 17 represent a set of the value of the laser output and the value of the material supply amount.

The point 54 illustrated in FIG. 17 is similar to the point 54 illustrated in FIG. 14. A point 58 illustrated in FIG. 17 represents an example of a set of the value of the laser output and the value of the material supply amount after readjustment in a case where the allowable error amount of the bead width error is not set. The transition from the point 54 to the point 58 in FIG. 17 represents a readjustment that does not change the laser output and increases the material supply amount.

A point 57 illustrated in FIG. 17 represents an example of a set of the value of the laser output and the value of the material supply amount after readjustment in a case where the allowable error amount of the bead width error is set. The transition from the point 54 to the point 57 in FIG. 17 represents a readjustment that reduces the laser output and increases the material supply amount. The increase in the material supply amount in the transition from the point 54 to the point 57 is smaller than the increase in the material supply amount in the transition from the point 54 to the point 58. By reducing the increase in the material supply amount, the additive manufacturing apparatus 100 can alleviate the enlargement of the bead height through setting of the allowable error amount of the bead width error.

The additive manufacturing apparatus 100 can reduce the bead width error in both the case where the allowable error amount is set and the case where the allowable error amount is not set. The additive manufacturing apparatus 100 can make the bead width error zero when the allowable error amount is not set. When the allowable error amount is set, the additive manufacturing apparatus 100 can keep the bead width error within the allowable error amount and can reduce the bead height error.

Figure 18:
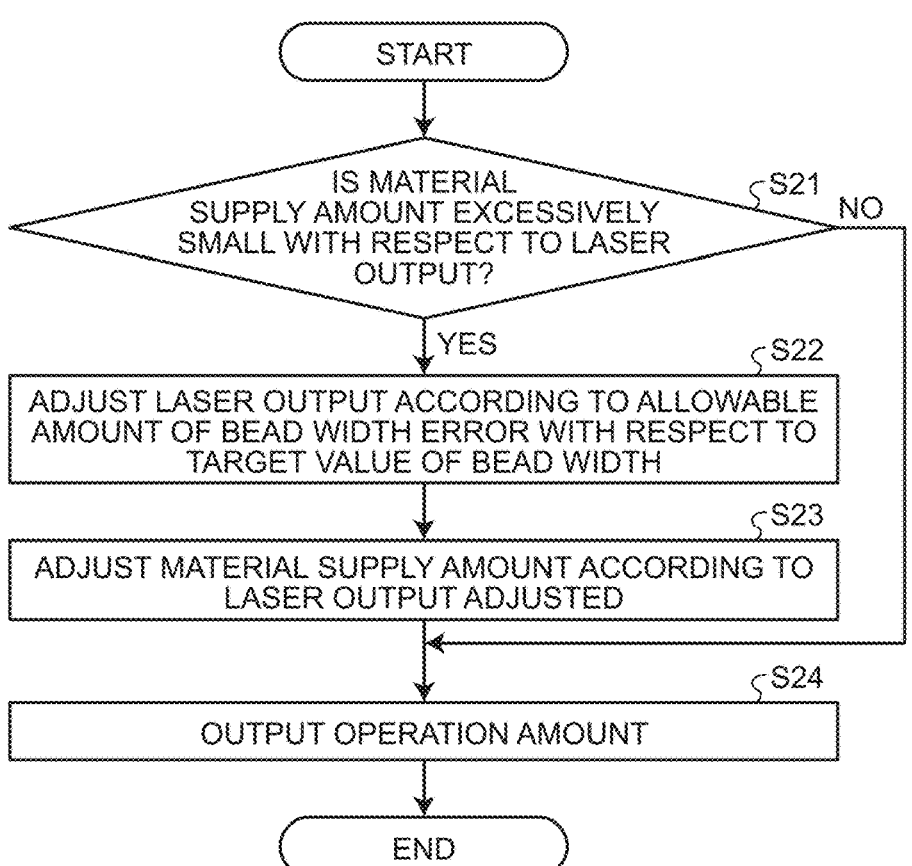
FIG. 18 is a flowchart illustrating an example of a procedure of processing by the operation amount readjustment unit of the additive manufacturing apparatus according to the second embodiment.

Next, a procedure of processing by the operation amount readjustment unit 33 will be described. FIG. 18 is a flowchart illustrating an example of a procedure of processing by the operation amount readjustment unit 33 of the additive manufacturing apparatus 100 according to the second embodiment. FIG. 18 illustrates an example of a processing procedure in a case where the allowable error amount of the bead width error is set.

The bead width modification control unit 31 adjusts the laser output based on the bead width error. The bead width modification control unit 31 outputs the value of the laser output. The bead height modification control unit 32 adjusts the material supply amount based on the bead height error. The bead height modification control unit 32 outputs the value of the material supply amount. The value of the laser output and the value of the material supply amount are input to the operation amount readjustment unit 33.

In step S21, the operation amount readjustment unit 33 determines whether the material supply amount is excessively small with respect to the laser output. When the value of the material supply amount is excessively smaller than the minimum value of the appropriate range, the operation amount readjustment unit 33 determines that the material supply amount is excessively small with respect to the laser output. In response to determining that the material supply amount is excessively small with respect to the laser output (step S21, Yes), the operation amount readjustment unit 33 advances the procedure to step S22. On the other hand, in response to determining that the material supply amount is not excessively small with respect to the laser output (step S21, No), the operation amount readjustment unit 33 advances the procedure to step S24.

In step S22, the operation amount readjustment unit 33 adjusts the laser output according to the allowable amount of the bead width error with respect to the target value of the bead width. The operation amount readjustment unit 33 performs an adjustment to reduce the laser output such that the bead width error matches the allowable error amount.

In step S23, the operation amount readjustment unit 33 adjusts the material supply amount according to the laser output adjusted in step S22. The operation amount readjustment unit 33 performs adjustment to increase the material supply amount such that the value of the material supply amount becomes equal to or larger than the minimum value of the appropriate range in the relationship between the laser output and the material supply amount.

In step S24, the operation amount readjustment unit 33 outputs the operation amount. That is, the operation amount readjustment unit 33 outputs the value of the laser output, which is the operation amount, and the value of the material supply amount, which is the operation amount. The operation amount readjustment unit 33 outputs a laser output command indicating the readjusted laser output value to the laser oscillator 2. The operation amount readjustment unit 33 outputs a material supply command indicating the readjusted material supply amount value to the material supply device 5. Then, the operation amount readjustment unit 33 ends the processing according to the procedure illustrated in FIG. 18.

In the above description, when the value of the material supply amount input to the operation amount readjustment unit 33 is smaller than the minimum value of the appropriate range, the operation amount readjustment unit 33 performs readjustment by prioritizing the material supply amount over the laser output. That is, the adjustment performed by the operation amount readjustment unit 33 is an adjustment that gives priority to bringing the bead width close to the target value over bringing the bead height close to the target value. In the second embodiment, when the value of the material supply amount input to the operation amount readjustment unit 33 is smaller than the minimum value of the appropriate range, the operation amount readjustment unit 33 may perform readjustment by prioritizing the laser output over the material supply amount. That is, the adjustment performed by the operation amount readjustment unit 33 may be an adjustment that gives priority to bringing the bead height close to the target value over bringing the bead width close to the target value. For example, by setting an excessive value as the allowable error amount which is an acceptable bead width error, the operation amount readjustment unit 33 may readjust only the laser output without readjusting the material supply amount. The additive manufacturing apparatus 100 can freely adjust the ratio between the adjustment of the bead width and the adjustment of the bead height by freely setting the allowable error amount.

In the actual additive manufacturing machining, even when the bead width is smaller than the target value, a defect does not necessarily occur in the object 17. By appropriately setting the allowable error amount of the bead width error, it is possible to avoid occurrence of a defect even when the bead width is smaller than the target value.

Figure 19:
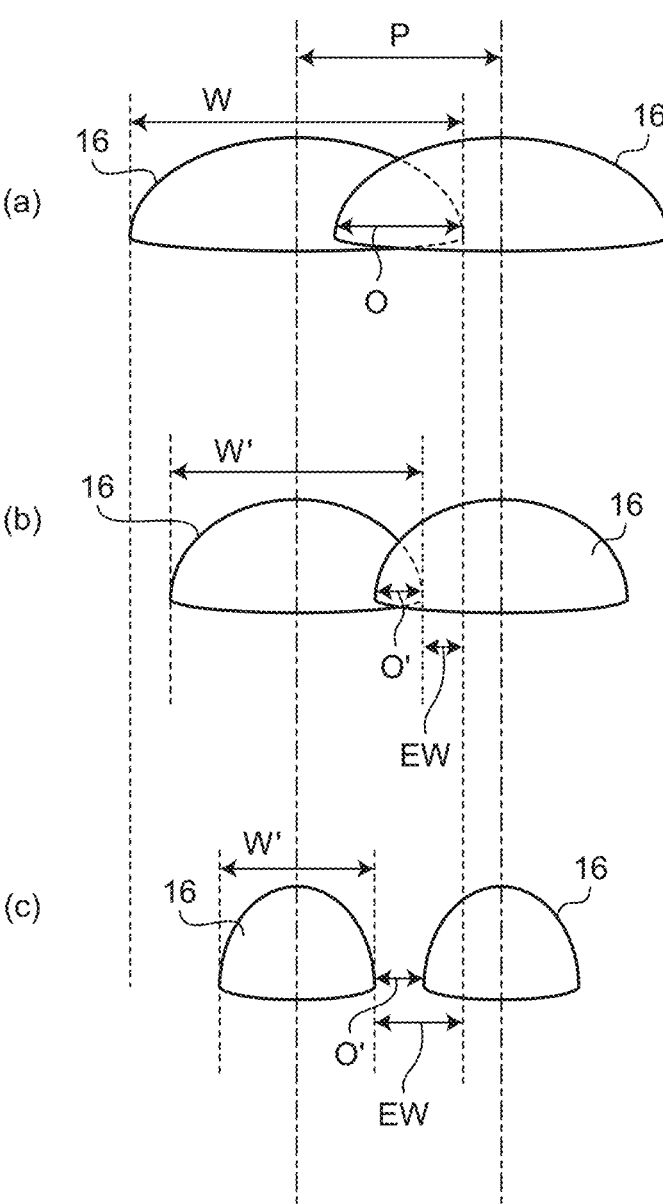
FIG. 19 is a diagram for explaining the relationship between the allowable error amount and the occurrence of defects in the object in the additive manufacturing apparatus according to the second embodiment.

FIG. 19 is a diagram for explaining the relationship between the allowable error amount and the occurrence of defects in the object 17 in the additive manufacturing apparatus 100 according to the second embodiment. In the following description, the width of a portion where adjacent beads 16 overlap each other is referred to as an overlap amount. The width of a portion where the beads 16 overlap each other is the width in the direction in which the beads 16 are arranged. In addition, the distance between one center position and the other center position of adjacent beads 16 is referred to as a bead center-to-center distance. The bead center-to-center distance is specified in advance by a machining program or the like.

The overlap amount can be calculated with the following formula.

$$\text{overlap amount}$$
$$=(\text{actual bead width})-(\text{bead center-to-center distance})$$
$$=(\text{target value of bead width})-(\text{allowable error amount of bead width error})-(\text{bead center-to-center distance})$$

FIGS. 19 (a), (b), and (c) illustrate an arrangement example of two beads 16 adjacent to each other. P shown in FIGS. 19 (a), (b), and (c) represents a bead center-to-center distance. When the overlap amount O is larger than zero, the two beads 16 overlap each other, and no defect occurs.

In the case illustrated in FIG. 19 (a), the bead width of each bead 16 matches the target value W. That is, the actual bead width of each bead 16 is W. In the case illustrated in FIG. 19 (a), it is assumed that EW, which is the allowable error amount of the bead width error, is zero. In the case illustrated in FIG. 19 (a), since O as the overlap amount is larger than zero, no defect occurs.

In the case illustrated in FIG. 19 (b), W' that is the bead width of each bead 16 is smaller than W that is the target value, and EW that is the allowable error amount of the bead width error is set. In the case illustrated in FIG. 19 (b), $0<EW<W-P$ holds. In this case, since O' as the overlap amount is larger than zero, no defect occurs.

In the case illustrated in FIG. 19 (c), W' that is the bead width of each bead 16 is smaller than W that is the target value, and EW that is the allowable error amount of the bead width error is set. In the case illustrated in FIG. 19 (c), $0<W-P<EW$ holds. In this case, since the overlap amount O' is smaller than zero, that is, the two beads 16 do not overlap each other, a defect occurs.

From the above, the additive manufacturing apparatus 100 can avoid the occurrence of defects with the allowable error amount of the bead width error satisfying the following condition.

$$(\text{allowable error amount of bead width error})<(\text{target value of bead width})-(\text{bead center-to-center distance})$$

According to the second embodiment, when the value of the material supply amount with respect to the value of the laser output is out of the appropriate range after the adjustment of the material supply amount or the laser output in the operation amount adjustment unit, the operation amount readjustment unit 33 selects one of the material supply amount or the laser output as the operation amount to be preferentially adjusted. The operation amount readjustment unit 33 preferentially readjusts the selected operation amount. When the value of the material supply amount is smaller than the minimum value of the appropriate range, the operation amount readjustment unit 33 selects the material supply amount as the operation amount to be preferentially adjusted. The additive manufacturing apparatus 100 can reduce the shape error of the bead 16 by adjusting the material supply amount or the laser output in the operation amount adjustment unit, and can prevent continuation of machining from becoming difficult by readjustment of the operation amount in the operation amount readjustment unit 33. Thus, the additive manufacturing apparatus 100 can achieve the effect of manufacturing the object 17 with reduced error.

The additive manufacturing apparatus 100 may execute both the processing described in the first embodiment and the processing described in the second embodiment. That is, the additive manufacturing apparatus 100 may perform the processing described in the first embodiment when the material supply amount is excessive with respect to the appropriate range, and may perform the processing described in the second embodiment when the material supply amount is excessively small with respect to the appropriate range.

Third Embodiment

In the additive manufacturing machining, an error from a target position may occur at the center position of the formed bead 16 due to a factor such as heat unevenness. If the influence of such an error extends to the shape of the object 17, the shape of the object 17 may become different from the target shape. Against such a phenomenon, if the position of the machining point is corrected based on the result of measuring the error of the center position of the bead 16, the bead 16 may be formed at a position away from the base material 18 or the object 17 on the base material 18 due to an excessive position correction amount. If the bead 16 cannot be brought into contact with the base material 18 or the object 17 due to the excessive position correction amount, it becomes difficult to continue machining. Furthermore, simply providing a constraint on the position correction amount makes it difficult to obtain the object 17 having a target shape.

In the third embodiment, when the position correction amount is constrained, the correction of bringing the shape of the object 17 closer to the target shape is performed by the adjustment of increasing the bead width, that is, the adjustment of increasing the laser output.

Figure 20:
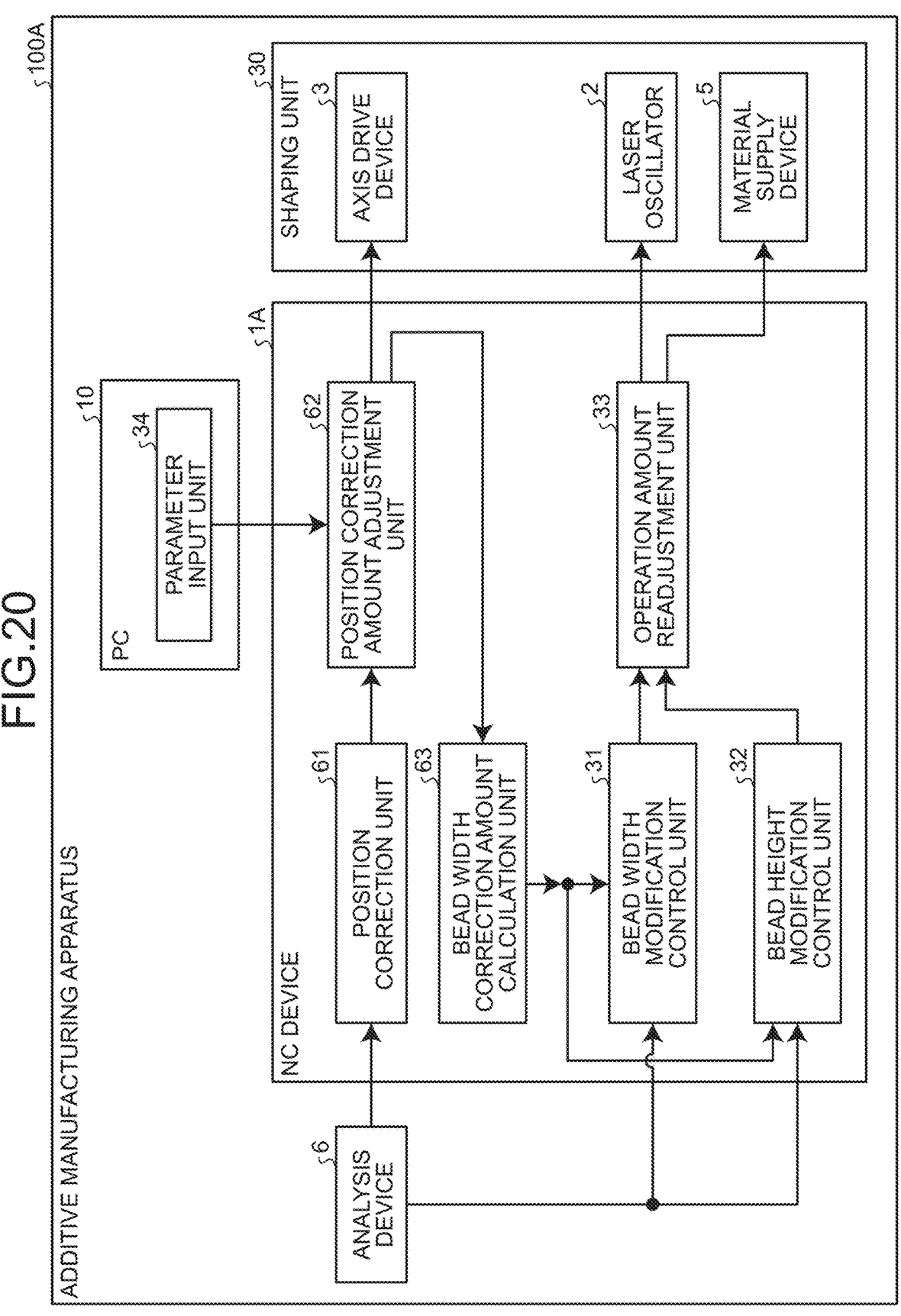
FIG. 20 is a diagram illustrating an exemplary functional configuration of an additive manufacturing apparatus according to the third embodiment.

FIG. 20 is a diagram illustrating an exemplary functional configuration of an additive manufacturing apparatus 100A according to the third embodiment. FIG. 20 illustrates an exemplary functional configuration for the function of reducing a bead position error which is an error in the center position of the bead 16. In the example illustrated in FIG. 20, a configuration similar to the configuration illustrated in FIG. 2, that is, a functional configuration for the function of reducing the shape error of the bead 16, is also provided. In the third embodiment, components identical to those in the first or second embodiment are denoted by the same reference signs, and configuration differences from the first or second embodiment will be mainly described.

The additive manufacturing apparatus 100A is different from the additive manufacturing apparatus 100 illustrated in FIG. 1 in that an NC device 1A is provided instead of the NC device 1. The configuration of the additive manufacturing apparatus 100A other than the NC device 1A is similar to that of the additive manufacturing apparatus 100 illustrated in FIG. 1. The NC device 1A is a control device that controls the entire additive manufacturing apparatus 100A. The NC device 1A includes the bead width modification control unit 31, the bead height modification control unit 32, the operation amount readjustment unit 33, a position correction unit

61, a position correction amount adjustment unit 62, and a bead width correction amount calculation unit 63.

The analysis device 6 obtains the bead position error by analyzing the image input from the camera 7 illustrated in FIG. 1. The analysis device 6 outputs a bead position error amount, which is a value of the bead position error, to the NC device 1A.

The bead position error amount calculated by the analysis device 6 is input to the position correction unit 61. After the bead position error amount is input, the position correction unit 61 obtains the correction amount of the machining point based on the bead position error amount. The position correction unit 61 outputs the obtained value of the correction amount to the position correction amount adjustment unit 62.

A value indicating an appropriate correction range is input to the parameter input unit 34 as a parameter value. The appropriate correction range is a range of values of the correction amount of the machining point with which the bead 16 can be appropriately formed. Through input of the value indicating the appropriate correction range to the parameter input unit 34, the appropriate correction range is set in the additive manufacturing apparatus 100. The parameter input unit 34 outputs a value indicating the appropriate correction range to the NC device 1A.

When the value of the correction amount obtained by the position correction unit 61 is out of the appropriate correction range indicated by the value input from the parameter input unit 34, the position correction amount adjustment unit 62 adjusts the value of the correction amount to a value included in the appropriate correction range. The position correction amount adjustment unit 62 corrects the position indicated by the position command based on the adjusted correction amount. The position correction amount adjustment unit 62 outputs the corrected position command to the axis drive device 3.

The position correction amount adjustment unit 62 determines whether the shape of the object 17 can be made to a target shape by the adjusted correction amount. When the value of the correction amount obtained by the position correction unit 61 is out of the appropriate correction range, the position correction amount adjustment unit 62 determines that the shape of the object 17 cannot be made to the target shape. The position correction amount adjustment unit 62 obtains a difference between the shape of the object 17 and the target shape which are in a case where the machining point is corrected with the correction amount adjusted by the position correction amount adjustment unit 62. The position correction amount adjustment unit 62 outputs a value indicating the obtained difference to the bead width correction amount calculation unit 63.

After the value indicating the difference is input, the bead width correction amount calculation unit 63 calculates the correction amount of the bead width based on the value indicating the difference. That is, the bead width correction amount calculation unit 63 calculates the bead width correction amount, which is the correction amount of the bead width, based on the difference between the shape of the object 17 and the target shape which are in a case where the machining point is corrected with the correction amount adjusted by the position correction amount adjustment unit 62. The bead width correction amount calculation unit 63 outputs the calculated value of the correction amount to each of the bead width modification control unit 31 and the bead height modification control unit 32.

As in the first or second embodiment, after the bead width error amount is input, the bead width modification control unit 31 adjusts the laser output indicated by the laser output command based on the bead width error amount. The bead width modification control unit 31 corrects the laser output based on the value of the correction amount input from the bead width correction amount calculation unit 63. After the bead height error amount is input, the bead height modification control unit 32 adjusts, based on the bead height error amount, the material supply amount indicated by the material supply command. In addition, the bead height modification control unit 32 corrects the material supply amount based on the value of the correction amount input from the bead width correction amount calculation unit 63. The operation amount adjustment unit corrects at least one of the laser output or the material supply amount based on the bead width correction amount. The bead width of the formed bead 16 is corrected by the correction of the laser output in the bead width modification control unit 31 and the correction of the material supply amount in the bead height modification control unit 32.

Figure 21:
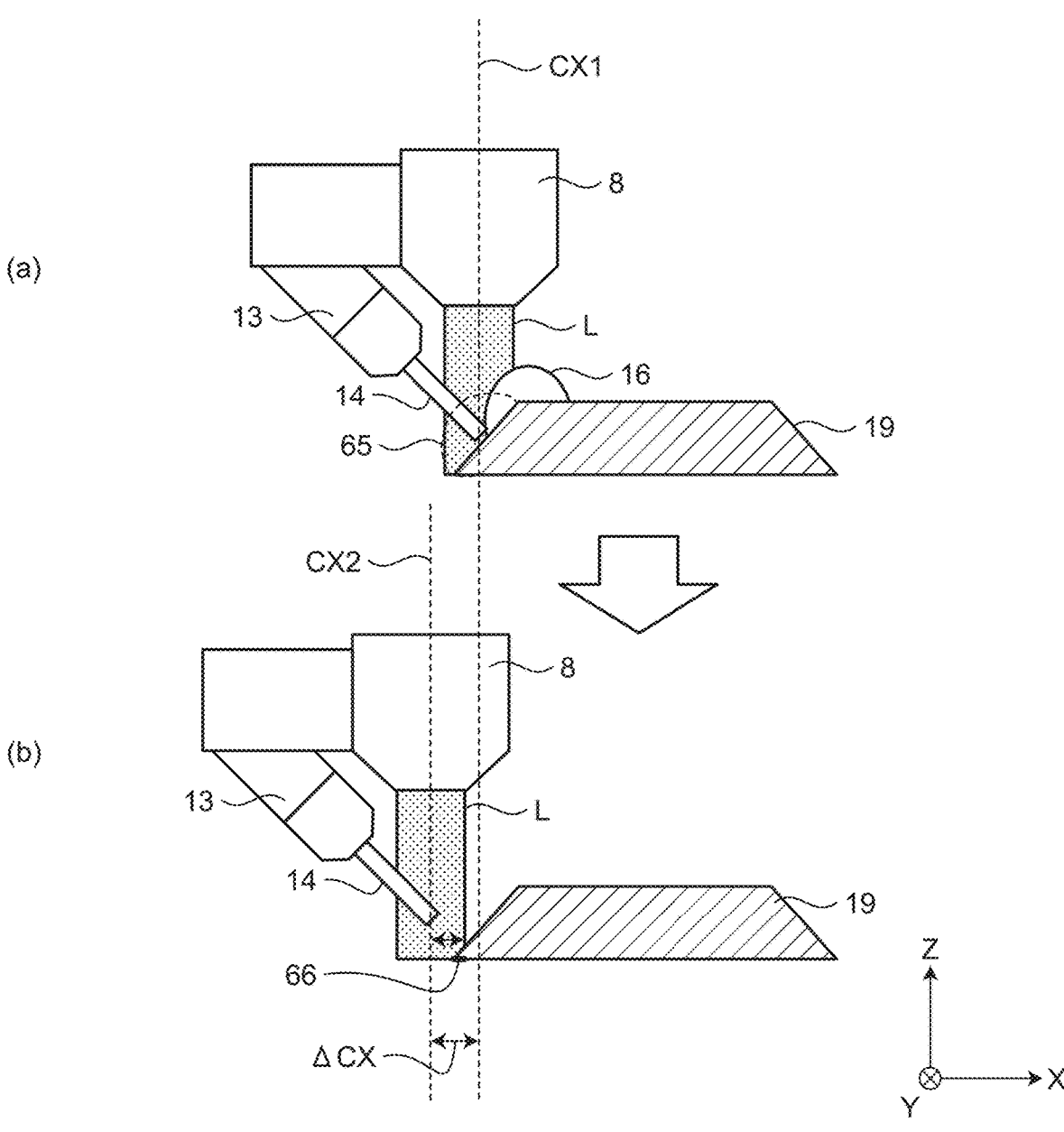
FIG. 21 is a first diagram for explaining a relationship between the correction of the machining point and the formation of the bead in the additive manufacturing apparatus according to the third embodiment.

Next, the relationship between the correction of the machining point according to the bead position error and the formation of the bead 16 will be described. FIG. 21 is a first diagram for explaining a relationship between the correction of the machining point and the formation of the bead 16 in the additive manufacturing apparatus 100A according to the third embodiment. FIG. 21 (*a*) illustrates a state in which the bead 16 is formed on the workpiece 19. In FIG. 21 (*a*), the progress direction of machining is the Y-axis direction. The machining point is a position on the central axis of the beam nozzle. CX1 is the position of the central axis of the beam nozzle in the state illustrated in FIG. 21 (*a*).

It is assumed that the bead 16 illustrated in FIG. 21 (*a*) is supposed to be formed in a region 65 at the outer edge of the workpiece 19. The center position of the formed bead 16 is not aligned with the center position of the region 65. If the bead position error of the formed bead 16 becomes excessive, a defect occurs in the object 17. If a defect occurs in the object 17, it may be difficult to continue machining.

FIG. 21 (*b*) illustrates, as an example, a state in which the modification of the bead position error as illustrated in FIG. 21 (*a*) is performed only by performing the correction of the machining point. CX2 is the position of the central axis of the beam nozzle in the state illustrated in FIG. 21 (*b*). The distance between CX1 and CX2 corresponds to $\Delta$CX which is the correction amount of the machining point.

FIG. 21 (*b*) illustrates a state in which the gap between the workpiece 19 and the corrected machining point is excessive and the bead 16 cannot be formed on the workpiece 19. In addition, a region 66 that is not irradiated with the laser beam L may be generated in a portion of the workpiece 19 where the bead 16 is supposed to be formed. As described above, since the bead 16 cannot be formed on the workpiece 19 only by correcting the machining point, it may be difficult to continue machining.

Figure 22:
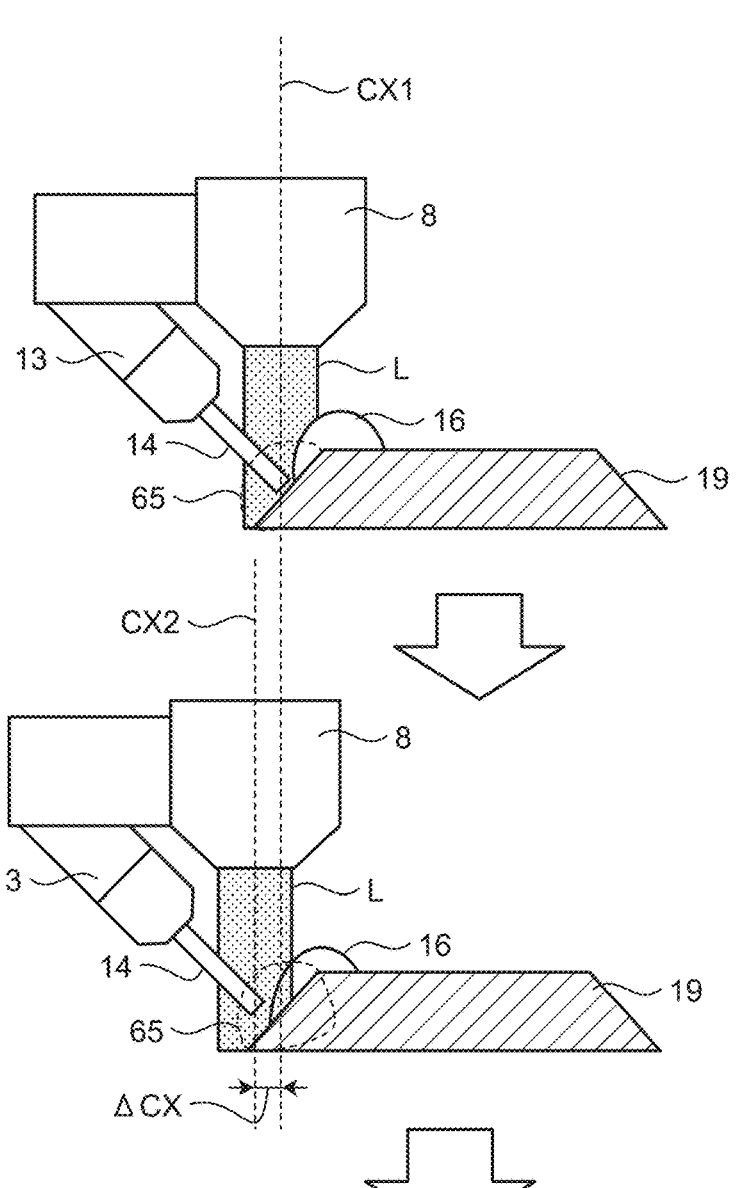
FIG. 22 is a second diagram for explaining a relationship between the correction of the machining point and the formation of the bead in the additive manufacturing apparatus according to the third embodiment.
Figure 22:
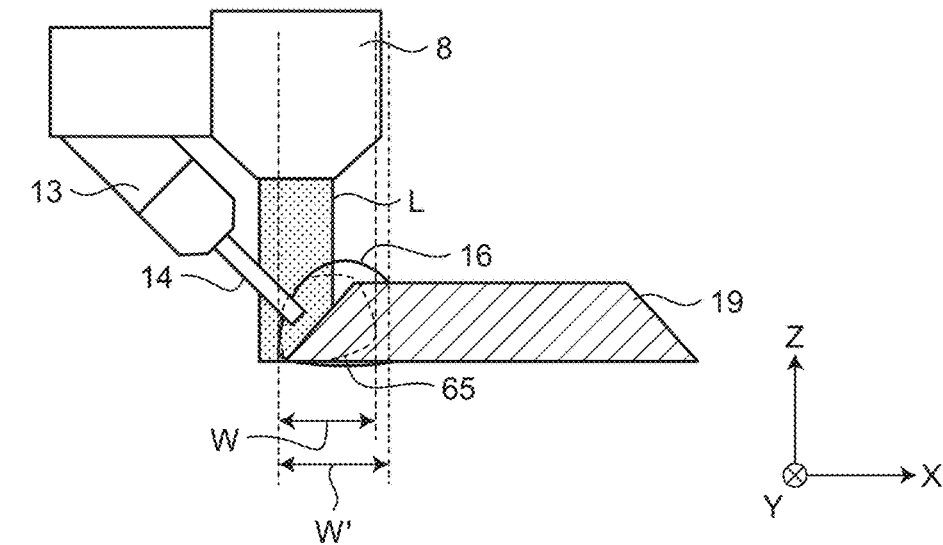

FIG. 22 is a second diagram for explaining a relationship between the correction of the machining point and the formation of the bead 16 in the additive manufacturing apparatus 100A according to the third embodiment. FIG. 22 illustrates a state in which modification of the bead position error by correction of the machining point and correction of the bead width are performed. FIG. 22 (*a*) illustrates, as an example, a state in which the bead 16 is formed on the workpiece 19 as in FIG. 21 (*a*).

In the state illustrated in FIG. 22 (*b*), it is assumed that the bead position error exceeds the value of the appropriate correction range. Since the position correction unit 61 calculates the correction amount based on the bead position error amount, the value of the correction amount obtained by the position correction unit 61 is out of the appropriate correction range. The position correction amount adjustment unit 62 adjusts $\Delta$CX, which is the position correction amount, to a value included in the appropriate correction range. The additive manufacturing apparatus 100A can prevent continuation of machining from becoming difficult by adjusting the value of the position correction amount in the position correction amount adjustment unit 62.

In the state shown in FIG. 22 (*b*), the shape of the object 17 does not satisfy the target shape due to constraint on the correction amount of the machining point to the appropriate correction range. As illustrated in FIG. 22 (*c*), the bead width of the formed bead 16 is corrected to W' larger than W that is the target value. The additive manufacturing apparatus 100A can cause the shape of the object 17 to match the target shape by correcting the bead width by the bead width correction amount calculation unit 63.

Figure 23:
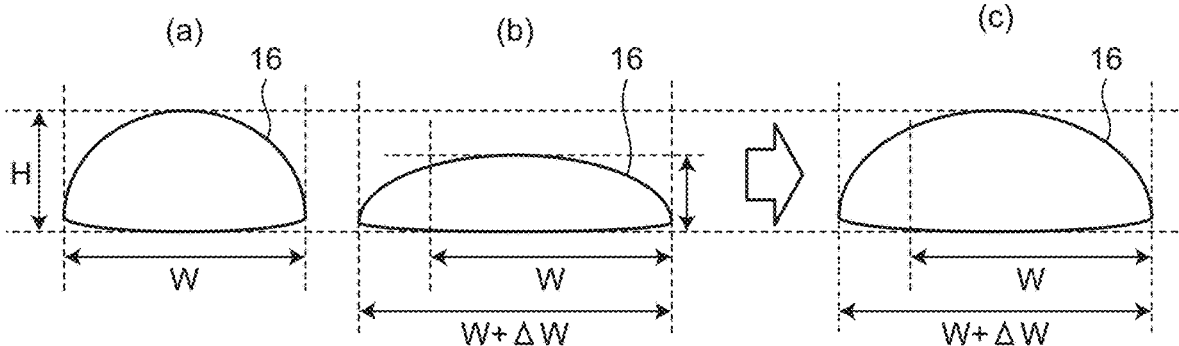
FIG. 23 is a diagram for explaining correction of the bead width in the additive manufacturing apparatus according to the third embodiment.

FIG. 23 is a diagram for explaining correction of the bead width in the additive manufacturing apparatus 100A according to the third embodiment. FIG. 23 (*a*) illustrates an example of the bead 16 before the bead width is corrected with the bead width correction amount calculated by the bead width correction amount calculation unit 63. The bead width of the bead 16 illustrated in FIG. 23 (*a*) is W which is the target value of the bead width. The bead height of the bead 16 illustrated in FIG. 23 (*a*) is H which is the target value of the bead height.

FIG. 23 (*b*) illustrates an example of the bead 16 in a case where only the bead width corrected from the state illustrated in FIG. 23 (*a*). The bead width correction amount calculation unit 63 calculates AW, which is the bead width correction amount, based on the difference between the shape of the object 17 and the target shape which are in a case where the machining point corrected with the correction amount adjusted by the position correction amount adjustment unit 62. The bead width modification control unit 31 increases the laser output based on the value of the bead width correction amount input from the bead width correction amount calculation unit 63. The bead width of the bead 16 illustrated in FIG. 23 (*b*) is W+$\Delta$W. However, if the material supply amount cannot be changed while the laser output is increased, the bead height of the formed bead 16 does not reach the target value H.

FIG. 23 (*c*) illustrates an example of the bead 16 in a case where the bead width and the bead height are corrected from the state illustrated in FIG. 23 (*a*). The bead height modification control unit 32 increases the material supply amount based on the value of the bead width correction amount input from the bead width correction amount calculation unit 63. As a result, as illustrated in FIG. 23 (*c*), the additive manufacturing apparatus 100A forms the bead 16 having a bead width W+$\Delta$W and a bead height H.

Figure 24:
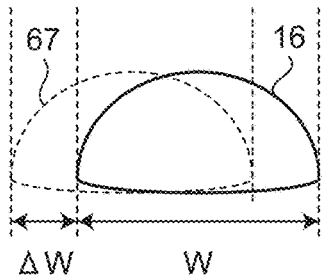
FIG. 24 is a diagram for explaining a correction amount calculated by the bead width correction amount calculation unit of the additive manufacturing apparatus according to the third embodiment.

FIG. 24 is a diagram for explaining a correction amount calculated by the bead width correction amount calculation unit 63 of the additive manufacturing apparatus 100A according to the third embodiment. In FIG. 24, the bead 16 having a bead position error and a contour shape 67 which is the target shape of the object 17 are illustrated. The bead width of the bead 16 is W. $\Delta$W, which is the correction amount calculated by the bead width correction amount calculation unit 63, corresponds to a difference between the contour shape 67 and the formed bead 16. The bead width correction amount calculation unit 63 outputs the calculated value of the bead width correction amount to each of the bead width modification control unit 31 and the bead height modification control unit 32.

Figure 25:
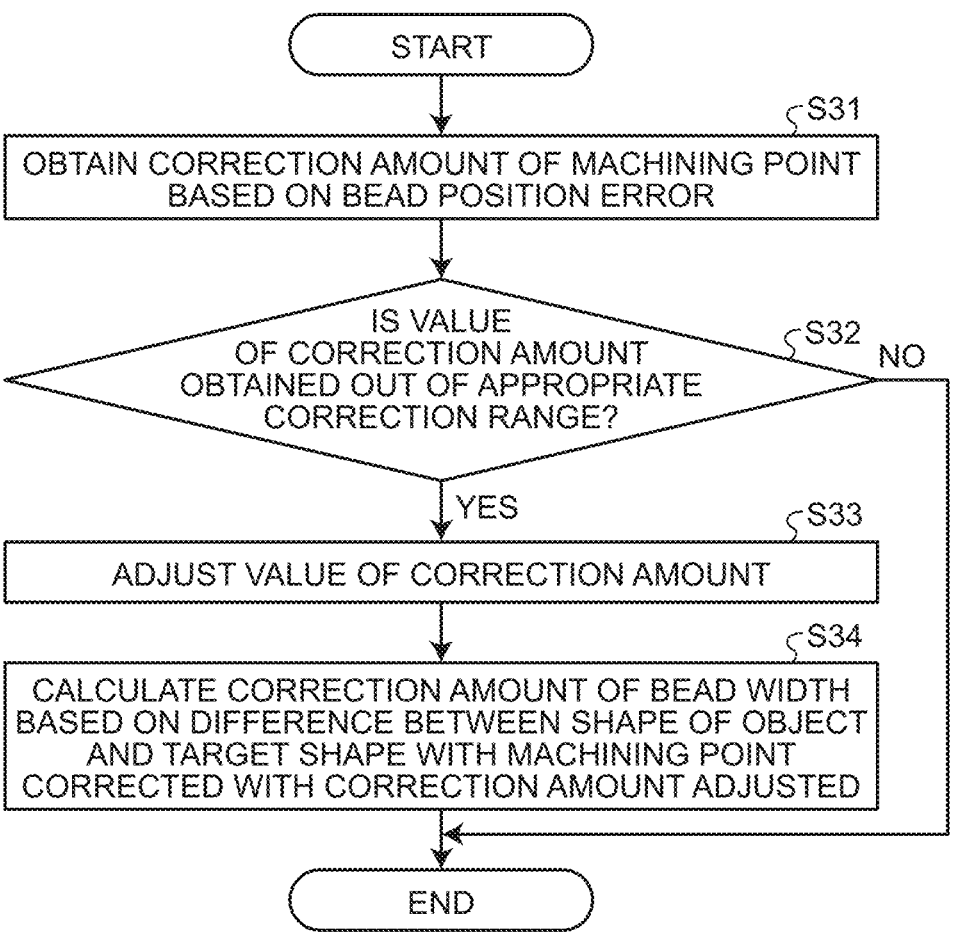
FIG. 25 is a flowchart illustrating an example of a procedure of processing by the position correction unit, the position correction amount adjustment unit, and the bead width correction amount calculation unit of the additive manufacturing apparatus according to the third embodiment.

Next, a procedure of processing by the position correction unit 61, the position correction amount adjustment unit 62, and the bead width correction amount calculation unit 63 will be described. FIG. 25 is a flowchart illustrating an example of a procedure of processing by the position correction unit 61, the position correction amount adjustment unit 62, and the bead width correction amount calculation unit 63 of the additive manufacturing apparatus 100A according to the third embodiment.

In step S31, the position correction unit 61 obtains the correction amount of the machining point based on the bead position error. The position correction unit 61 outputs the obtained value of the correction amount to the position correction amount adjustment unit 62.

In step S32, the position correction amount adjustment unit 62 determines whether the value of the correction amount obtained by the position correction unit 61 in step S31 is out of the appropriate correction range. In response to determining that the value of the correction amount is out of the appropriate correction range (step S32, Yes), the position correction amount adjustment unit 62 advances the procedure to step 333.

In step S33, the position correction amount adjustment unit 62 adjusts the value of the correction amount to a value included in the appropriate correction range. The position correction amount adjustment unit 62 outputs a position command corrected based on the adjusted correction amount to the axis drive device 3. The position correction amount adjustment unit 62 obtains a difference between the shape of the object 17 and the target shape in a case where the machining point is corrected with the correction amount adjusted in step S33. The position correction amount adjustment unit 62 outputs a value indicating the obtained difference to the bead width correction amount calculation unit 63.

In step S34, the bead width correction amount calculation unit 63 calculates the correction amount of the bead width based on the difference between the shape of the object 17 and the target shape which are in a case where the machining point is corrected with the correction amount adjusted in step S33. The bead width correction amount calculation unit 63 outputs the calculated value of the correction amount to each of the bead width modification control unit 31 and the bead height modification control unit 32.

Upon completion of step S34, the position correction unit 61, the position correction amount adjustment unit 62, and the bead width correction amount calculation unit 63 end the processing according to the procedure illustrated in FIG. 25. Alternatively, in response to a determination that the value of the correction amount is not out of the appropriate correction range (step S32, No), the position correction unit 61, the position correction amount adjustment unit 62, and the bead width correction amount calculation unit 63 end the processing according to the procedure illustrated in FIG. 25.

Note that the additive manufacturing apparatus 100A executes the processing described in the first embodiment or the processing described in the second embodiment together with the processing described in the third embodiment. The additive manufacturing apparatus 100A may execute both the processing described in the first embodiment and the processing described in the second embodiment together with the processing described in the third embodiment.

According to the third embodiment, when the value of the correction amount of the bead position error is out of the appropriate correction range, the position correction amount adjustment unit 62 adjusts the value of the correction amount to a value included in the appropriate correction range. The bead width correction amount calculation unit 63 calculates the correction amount of the bead width based on the difference between the shape of the object 17 and the target shape which are in a case where the machining point is corrected with the correction amount adjusted by the position correction amount adjustment unit 62. The additive manufacturing apparatus 100A can modify the bead position error and prevent continuation of machining from becoming difficult due to an excessive correction amount. The additive manufacturing apparatus 100A can reduce the shape error of the bead 16 by correcting the bead width. Thus, the additive manufacturing apparatus 100A can achieve the effect of manufacturing the object 17 with reduced error.

Next, a hardware configuration for implementing the NC devices 1 and 1A according to the first to third embodiments will be described. The NC devices 1 and 1A are implemented by processing circuitry. The processing circuitry may be a circuit in which a processor executes software or a dedicated circuit.

Figure 26:
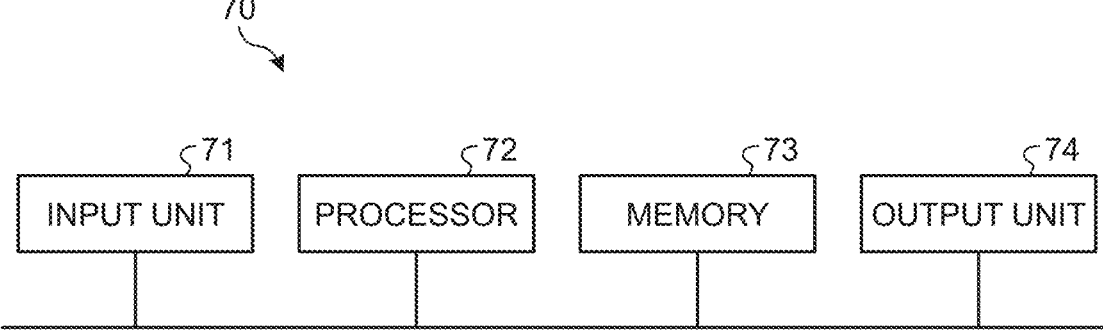
FIG. 26 is a diagram illustrating an exemplary configuration of the control circuit according to the first to third embodiments.

In a case where the processing circuitry is implemented by software, the processing circuitry is, for example, a control circuit 70 illustrated in FIG. 26. FIG. 26 is a diagram illustrating an exemplary configuration of the control circuit 70 according to the first to third embodiments. The control circuit 70 includes an input unit 71, a processor 72, a memory 73, and an output unit 74.

The input unit 71 is an interface circuit that receives data input from the outside of the control circuit 70 and provides data to the processor 72. The output unit 74 is an interface circuit that transmits data from the processor 72 or the memory 73 to the outside of the control circuit 70. In a case where the processing circuitry is the control circuit 70 illustrated in FIG. 26, the processor 72 reads and executes a program stored in the memory 73, thereby implementing the functions of the NC devices 1 and 1A. The memory 73 is also used as a temporary memory for each process performed by the processor 72.

In a case where the processing circuitry is the control circuit 70 illustrated in FIG. 26, the NC devices 1 and 1A are implemented by software, firmware, or a combination of software and firmware. Software or firmware is described as a program and stored in the memory 73. In the processing circuitry, the processor 72 reads and executes the program stored in the memory 73, thereby implementing each function of the NC devices 1 and 1A. That is, the processing circuitry includes the memory 73 for storing programs that result in the execution of processing of the NC devices 1 and 1A. It can also be said that these programs cause a computer to execute the procedures and methods for the NC devices 1 and 1A.

The processor 72 is a central processing unit (CPU), a processing device, an arithmetic device, a microprocessor, a microcomputer, a processor, or a digital signal processor (DSP). Examples of the memory 73 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read only memory (EEPROM, registered trademark), and the like.

Figure 27:
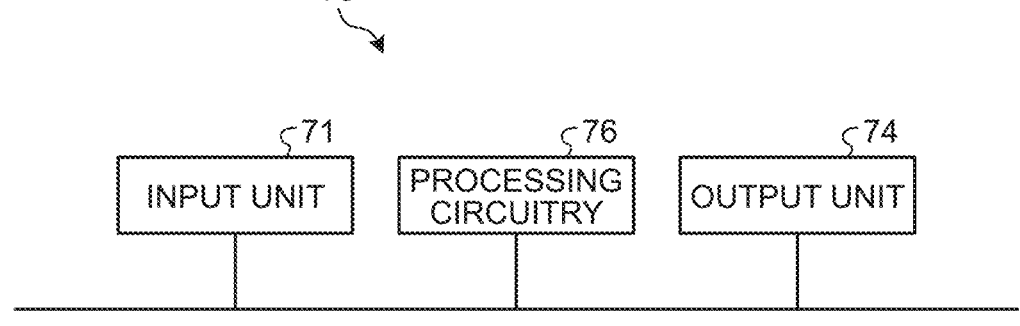
FIG. 27 is a diagram illustrating an exemplary configuration of a dedicated hardware circuit according to the first to third embodiments.

FIG. 26 is an example of hardware for implementing the NC devices 1 and 1A with the general-purpose processor 72 and memory 73, but the NC devices 1 and 1A may be implemented by a dedicated hardware circuit. FIG. 27 is a diagram illustrating an exemplary configuration of a dedicated hardware circuit 75 according to the first to third embodiments.

The dedicated hardware circuit 75 includes the input unit 71, the output unit 74, and processing circuitry 76. The processing circuitry 76 is a single circuit, a composite circuit, a programmed processor, a parallel programmed processor, an application specific integrated circuit (ASIC), a field programmable gate array (FPGA), or a circuit that is a combination thereof. Note that the NC devices 1 and 1A may be implemented by combining the control circuit 70 and the hardware circuit 75.

The PC 10 in the first to third embodiments is implemented by hardware similar to the hardware illustrated in FIG. 26. The function of the parameter input unit 34 is implemented by the input unit 71. In addition, the PC 10 includes an input device operated by the user and a display device that displays a screen. The input device includes, for example, a keyboard, a mouse, a keypad, a touch panel, or the like. The display device is, for example, a liquid crystal display (LCD) or an organic electro-luminescence (EL) display.

Specific modes of distribution or integration of the components of the NC devices 1 and 1A described in the first to third embodiments are not limited to those described in the first to third embodiments. All or some of the components of the NC devices 1 and 1A may be configured to be distributed or integrated functionally or physically in any unit.

The configurations described in the above-mentioned embodiments indicate examples of the contents of the present disclosure. The configurations of the embodiments can be combined with another well-known technique. The configurations of the embodiments may be combined with each other as appropriate. Some of the configurations of the embodiments can be omitted or changed without departing from the gist of the present disclosure.

REFERENCE SIGNS LIST

1, 1A NC device; 2 laser oscillator; 3 axis drive device; 4 gas supply device; 5 material supply device; 6 analysis device; 7 camera; 8 machining head; 9 gas nozzle; 10 PC; 11 measurement instrument; 12 material supply source; 13 material supply nozzle; 14 wire; 15 molten pool; 16 bead; 17 object; 18 base material; 19 fiber cable; 21 stage; 30 shaping unit; 31 bead width modification control unit; 32 bead height modification control unit; 33 operation amount readjustment unit; 34 parameter input unit; 41 drop; 42, 43 straight line; 44, 45, 46, 51, 52, 53, 54, 55, 56, 57, 58 point; 48, 49 broken line; 61 position correction unit; 62 position correction amount adjustment unit; 63 bead width correction amount calculation unit; 65, 66 region; 67 contour shape; 70 control circuit; 71 input unit; 72 processor; 73 memory; 74 output unit; 75 hardware circuit; 76 processing circuitry; 100, 100A additive manufacturing apparatus.

The invention claimed is:

1. An additive manufacturing apparatus comprising:
   shaping circuitry including material supply circuitry to supply a material to a workpiece, heat source output circuitry to output a heat source for melting the material, and drive circuitry to move the heat source and the material supply circuitry, the shaping circuitry being configured to form a bead with the material melted using the heat source;
   operation amount adjustment circuitry to adjust a material supply amount of the material supply circuitry or a heat source output of the heat source output circuitry based on a shape error of the bead; and
   operation amount readjustment circuitry to, in a case where an appropriate range that is a range of a value of the material supply amount with respect to a value of the heat source output with which the bead can be appropriately formed is set and a value of the material supply amount with respect to a value of the heat source output is out of the appropriate range after adjustment by the operation amount adjustment circuitry, select one of the material supply amount or the heat source output to be preferentially adjusted based on a magnitude of a value of the material supply amount with respect to the appropriate range, and preferentially readjust the selected one of the material supply amount or the heat source output.

2. The additive manufacturing apparatus according to claim 1, wherein
   the operation amount adjustment circuitry includes:
      bead width modification control circuitry to control modification of a bead width by adjusting the heat source output based on a bead width error that is an error in a width of the bead formed; and
      bead height modification control circuitry to control modification of a bead height by adjusting the material supply amount based on a bead height error that is an error in a height of the bead formed,
   the operation amount readjustment circuitry preferentially readjusts the selected one of the material supply amount or the heat source output in a case where a value of the material supply amount with respect to a value of the heat source output is out of the appropriate range after adjustment of the heat source output by the bead width modification control circuitry or after adjustment of the material supply amount by the bead height modification control circuitry.

3. The additive manufacturing apparatus according to claim 2, wherein in a case where a value of the material supply amount is larger than a maximum value of the appropriate range, the operation amount readjustment circuitry selects the heat source output to be preferentially adjusted.

4. The additive manufacturing apparatus according to claim 3, further comprising:
   allowable error amount setting circuitry to set an allowable error amount that is an acceptable value of the bead height error, wherein
   the operation amount readjustment circuitry readjusts the heat source output and the material supply amount by consideration of the allowable error amount set.

5. The additive manufacturing apparatus according to claim 2, wherein in a case where a value of the material supply amount is smaller than a minimum value of the appropriate range, the operation amount readjustment circuitry selects the material supply amount to be preferentially adjusted.

6. The additive manufacturing apparatus according to claim 5, further comprising:
   allowable error amount setting circuitry to set an allowable error amount that is an acceptable value of the bead width error, wherein
   the operation amount readjustment circuitry readjusts the material supply amount and the heat source output by consideration of the allowable error amount set.

7. The additive manufacturing apparatus according to claim 1, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

8. An additive manufacturing apparatus comprising:

shaping circuitry including material supply circuitry to supply a material to a workpiece, heat source output circuitry to output a heat source for melting the material, and drive circuitry to move the heat source and the material supply circuitry, the shaping circuitry being configured to form a bead with the material melted using the heat source;

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a correction amount of a bead width based on a difference between a shape of an additively manufactured object and a target shape in a case where the machining point is corrected with the correction amount adjusted by the position correction amount adjustment circuitry.

9. An additive manufacturing method comprising:

adjusting a value of a material supply amount of material supply circuitry that supplies a material to a workpiece or a heat source output of heat source output circuitry that outputs a heat source for melting the material based on a shape error of a bead that is formed with the material melted using the heat source; and in a case where an appropriate range that is a range of a value of the material supply amount with respect to a value of the heat source output with which the bead can be appropriately formed is set and a value of the material supply amount with respect to a value of the heat source output is out of the appropriate range after adjustment of the material supply amount or the heat source output, selecting one of the material supply amount or the heat source output to be preferentially adjusted based on a magnitude of a value of the material supply amount with respect to the appropriate range, and preferentially readjusting the selected one of the material supply amount or the heat source output.

10. The additive manufacturing apparatus according to claim 2, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

11. The additive manufacturing apparatus according to claim 3, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

12. The additive manufacturing apparatus according to claim 4, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

13. The additive manufacturing apparatus according to claim 5, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

14. The additive manufacturing apparatus according to claim 6, further comprising:

position correction circuitry to obtain, based on a bead position error that is an error of a center position of the bead to be formed, a correction amount of a machining point to which the heat source and the material are supplied;

position correction amount adjustment circuitry to, in a case where an appropriate correction range that is a range of a value of the correction amount with which the bead can be appropriately formed is set and the value of the correction amount obtained by the position correction circuitry is out of the appropriate correction range, adjust the value of the correction amount to a value included in the appropriate correction range; and bead width correction amount calculation circuitry to calculate a bead width correction amount that is a correction amount of the bead width based on a difference between a shape of an additively manufactured object and a target shape which are in a case where the machining point is corrected with the correction amount adjusted by the position correction amount adjustment circuitry, wherein the operation amount adjustment circuitry corrects at least one of the heat source output or the material supply amount based on the bead width correction amount.

15. The additive manufacturing apparatus according to claim 1, wherein the operation amount readjustment circuitry selects the heat source output to be preferentially adjusted in a case where the value of the material supply amount is larger than a maximum value of the appropriate range.

16. The additive manufacturing apparatus according to claim 1, wherein the operation amount readjustment circuitry selects the material supply amount to be preferentially adjusted in a case where the value of the material supply amount is smaller than a minimum value of the appropriate range.

17. The additive manufacturing apparatus according to claim 15, wherein the operation amount readjustment circuitry selects the material supply amount to be preferentially adjusted in a case where the value of the material supply amount is smaller than a minimum value of the appropriate range.

* * * * *